United States Patent
Ohashi et al.

(10) Patent No.: US 8,330,602 B2
(45) Date of Patent: Dec. 11, 2012

(54) ROLL OF TAPE WITH RFID TAG, TAG TAPE, AND CARTRIDGE FOR INCLUDING AT LEAST A RFID TAG

(75) Inventors: Tsuyoshi Ohashi, Hashima (JP); Mitsugi Tanaka, Nagoya (JP); Toshio Takahashi, Nagoya (JP); Kiyoichi Ohta, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1631 days.

(21) Appl. No.: 11/739,653

(22) Filed: Apr. 24, 2007

(65) Prior Publication Data

US 2008/0084274 A1 Apr. 10, 2008

Related U.S. Application Data

(63) Continuation-in-part of application No. PCT/JP2005/019932, filed on Oct. 28, 2005.

(30) Foreign Application Priority Data

Nov. 5, 2004 (JP) .................................. 2004-321431
Nov. 24, 2004 (JP) .................................. 2004-339022
Nov. 24, 2004 (JP) .................................. 2004-339023

(51) Int. Cl.
*G08B 23/00* (2006.01)
*H04Q 5/22* (2006.01)
*G06K 19/02* (2006.01)
*G06K 19/06* (2006.01)
*B21D 11/00* (2006.01)

(52) U.S. Cl. ............. 340/572.8; 340/572.9; 340/10.1; 235/488; 235/492; 29/430

(58) Field of Classification Search ........... 340/572.8, 340/10.1
See application file for complete search history.

(56) References Cited

U.S. PATENT DOCUMENTS

| 5,049,921 | A | 9/1991 | Sonobe et al. |
| 6,478,229 | B1 * | 11/2002 | Epstein ................. 235/492 |
| 6,977,112 | B2 * | 12/2005 | Shino et al. ............ 428/195.1 |

(Continued)

FOREIGN PATENT DOCUMENTS

JP  H02-219045 A  8/1990

(Continued)

OTHER PUBLICATIONS

International Search Report for Int'l Patent Appl'n No. PCT/JP2005/019932, mailed Dec. 27, 2005.

(Continued)

*Primary Examiner* — George Bugg
*Assistant Examiner* — Jack K Wang
(74) *Attorney, Agent, or Firm* — Baker Botts L.L.P.

(57) ABSTRACT

A first roll is provided, which is formed by winding a base tape having a tape-state base film in which a plurality of RFID circuit elements are disposed with a predetermined interval in the lengthwise direction, an adhesive layer with a predetermined width for affixing the RFID circuit element to a target to be affixed, disposed on one face of the base film, and a separation sheet with a width larger than that of the adhesive layer and disposed so as to extend in the lengthwise direction of the adhesive layer around a reel axis approximately perpendicular to the lengthwise direction.

10 Claims, 32 Drawing Sheets

U.S. PATENT DOCUMENTS

| | | | |
|---|---|---|---|
| 6,988,666 B2 * | 1/2006 | Appalucci et al. | 235/488 |
| 2004/0188010 A1 * | 9/2004 | Chaoui | 156/269 |
| 2005/0091821 A1 * | 5/2005 | Best et al. | 29/430 |
| 2007/0006963 A1 * | 1/2007 | Bever | 156/213 |

FOREIGN PATENT DOCUMENTS

| | | |
|---|---|---|
| JP | H06-004047 U | 1/1994 |
| JP | H07-101432 A | 4/1995 |
| JP | 2000-251046 A | 9/2000 |
| JP | 2001-288870 A | 10/2001 |
| JP | 2002-053248 A | 2/2002 |
| JP | 2002-074312 A | 3/2002 |
| JP | 2002-328012 A | 11/2002 |
| JP | 2002-347145 A | 12/2002 |
| JP | 2003-178271 A | 6/2003 |
| JP | 2003-288572 A | 10/2003 |

OTHER PUBLICATIONS

Written Opinion of the International Searching Authority for International Application No. PCT/JP2005/019932.

Japan Patent Office, Notice of Reasons for Rejection for International Patent No. JP2004-339023, mailed Jul. 28, 2010.

Japan Patent Office, Notice of Reasons for Rejection for International Patent No. JP2004-339022, mailed Aug. 24, 2010.

Japan Patent Office, Notice of Reasons for Rejection for International Patent No. JP2004-321431, mailed Jul. 28, 2010.

* cited by examiner

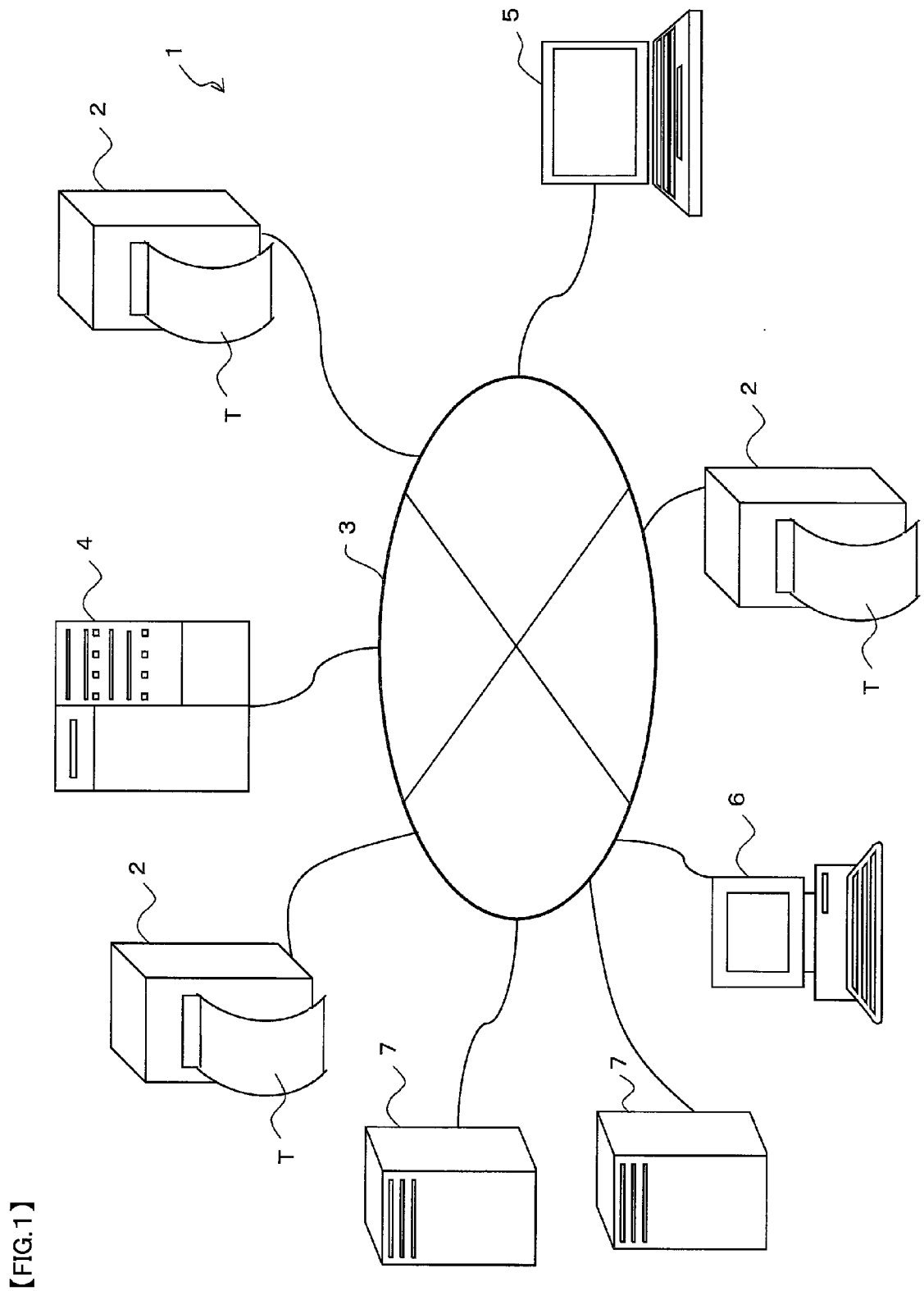
[FIG.1]

[FIG.2]
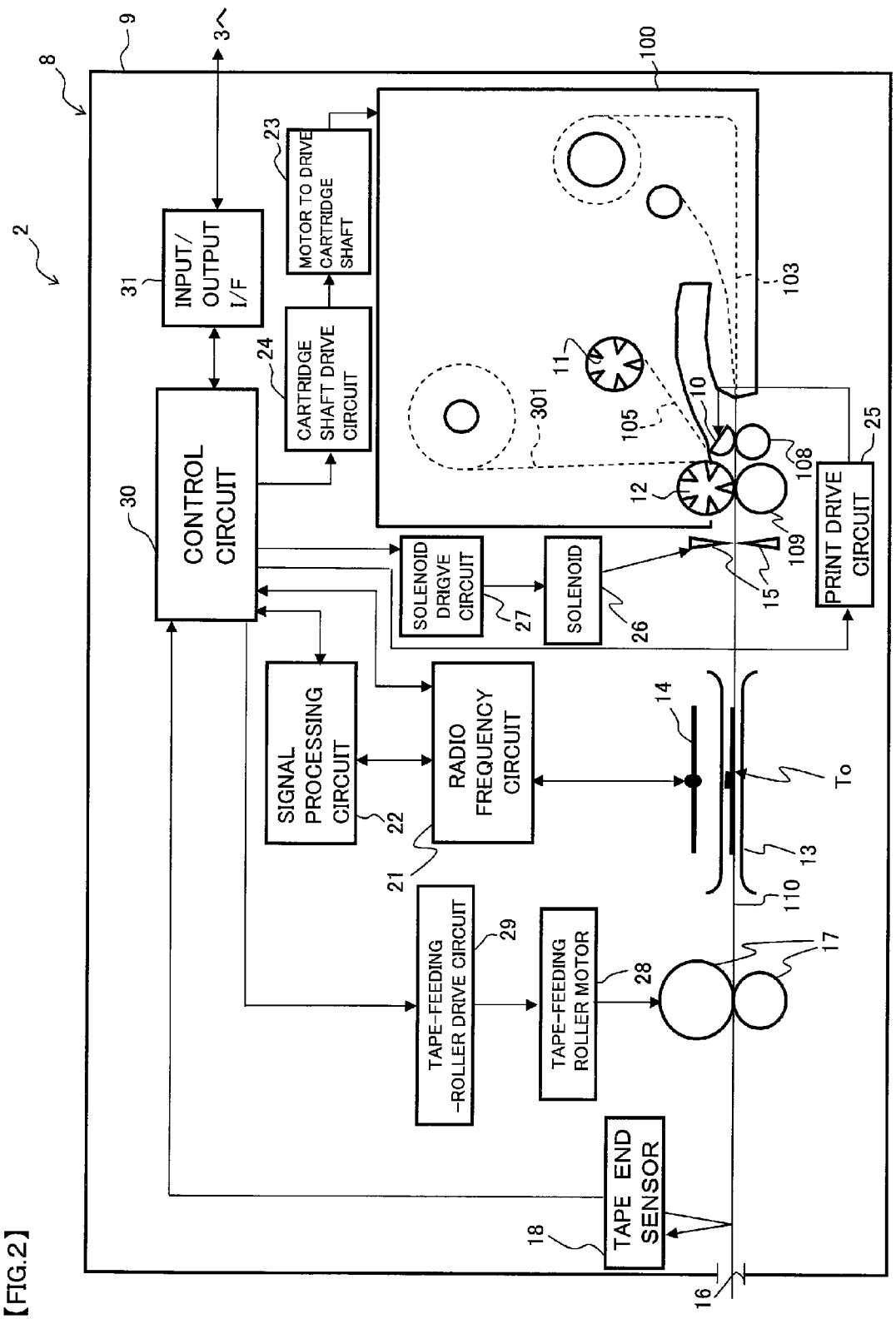

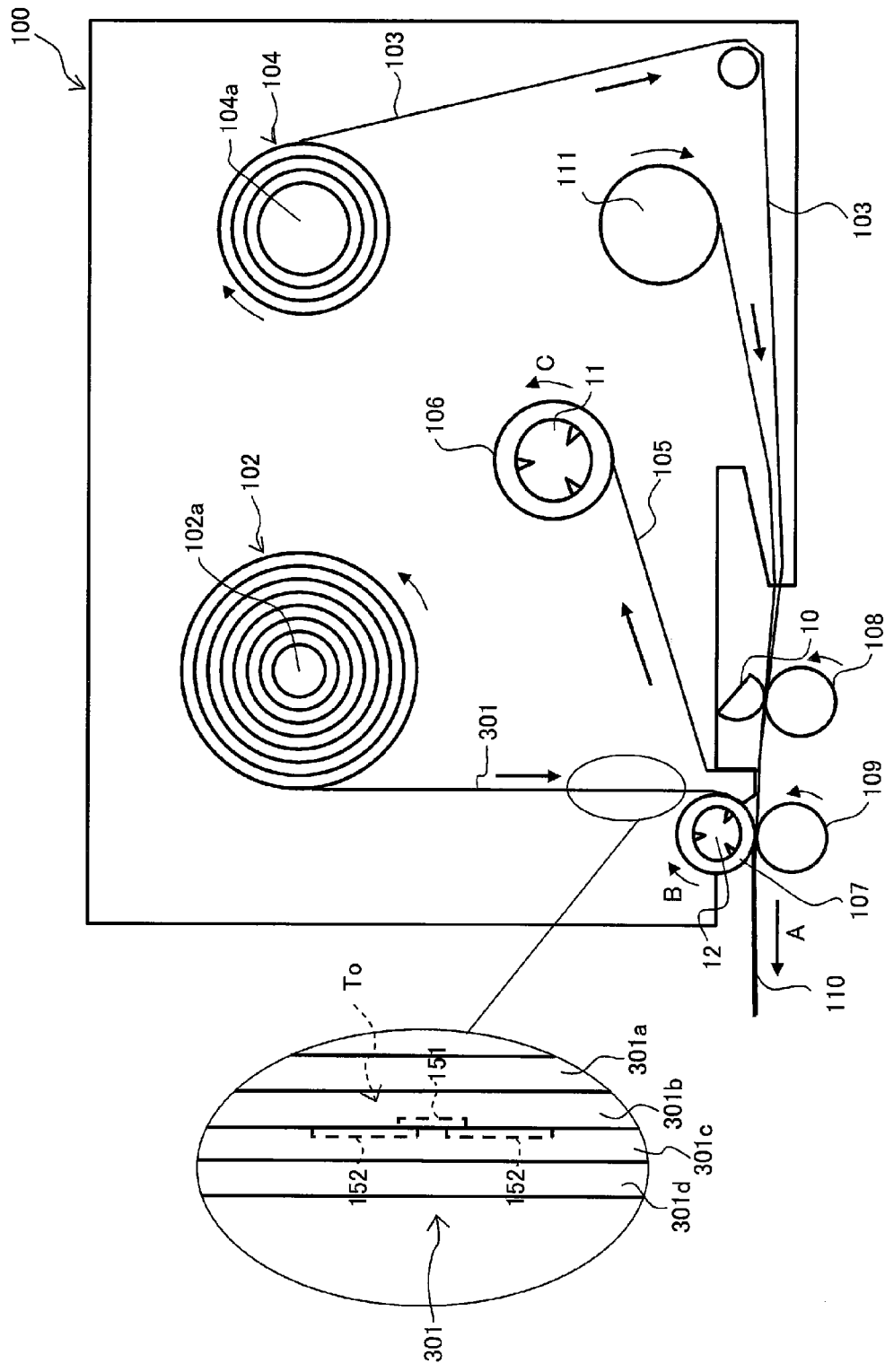
[FIG.3]

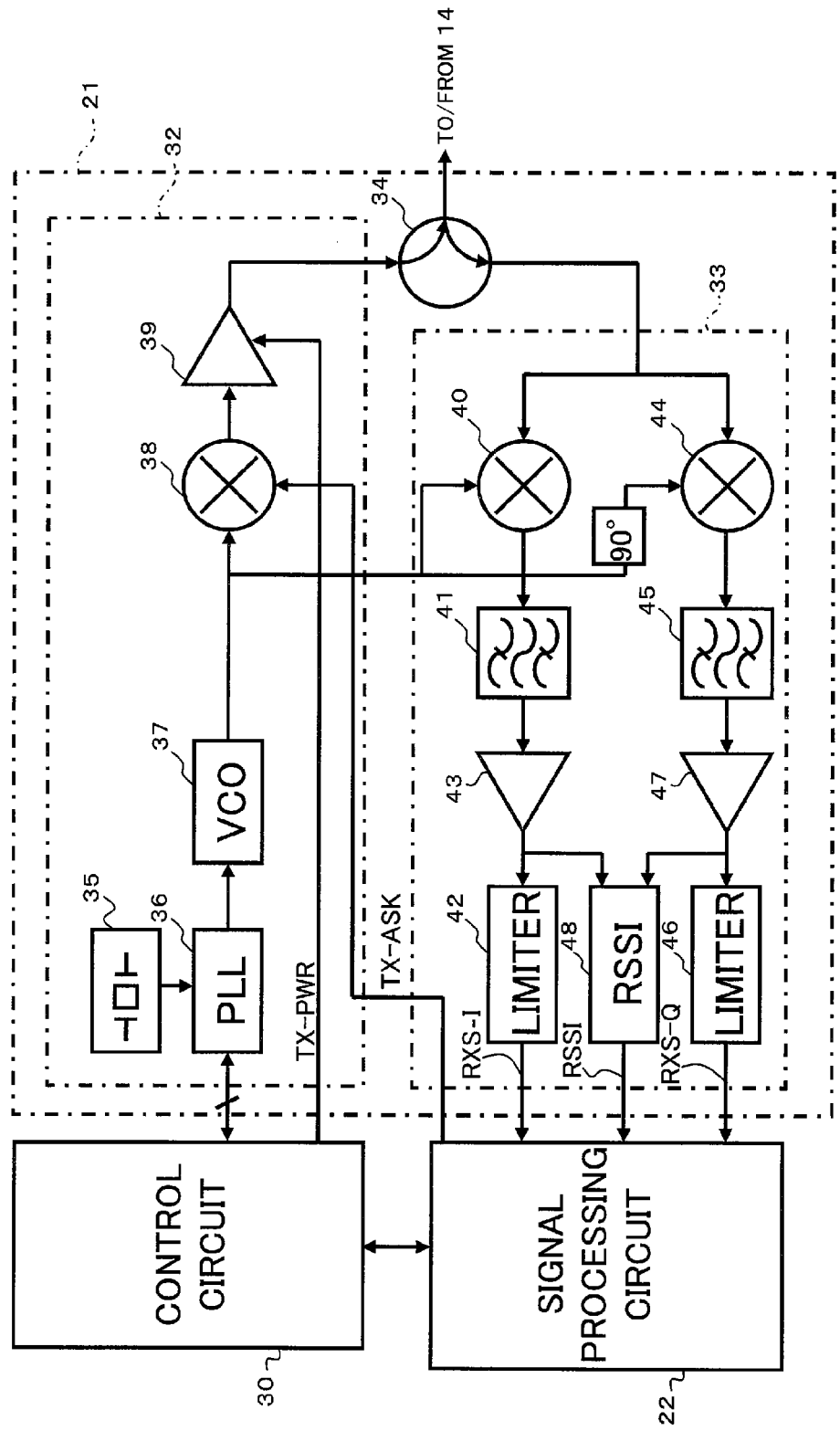
[FIG.4]

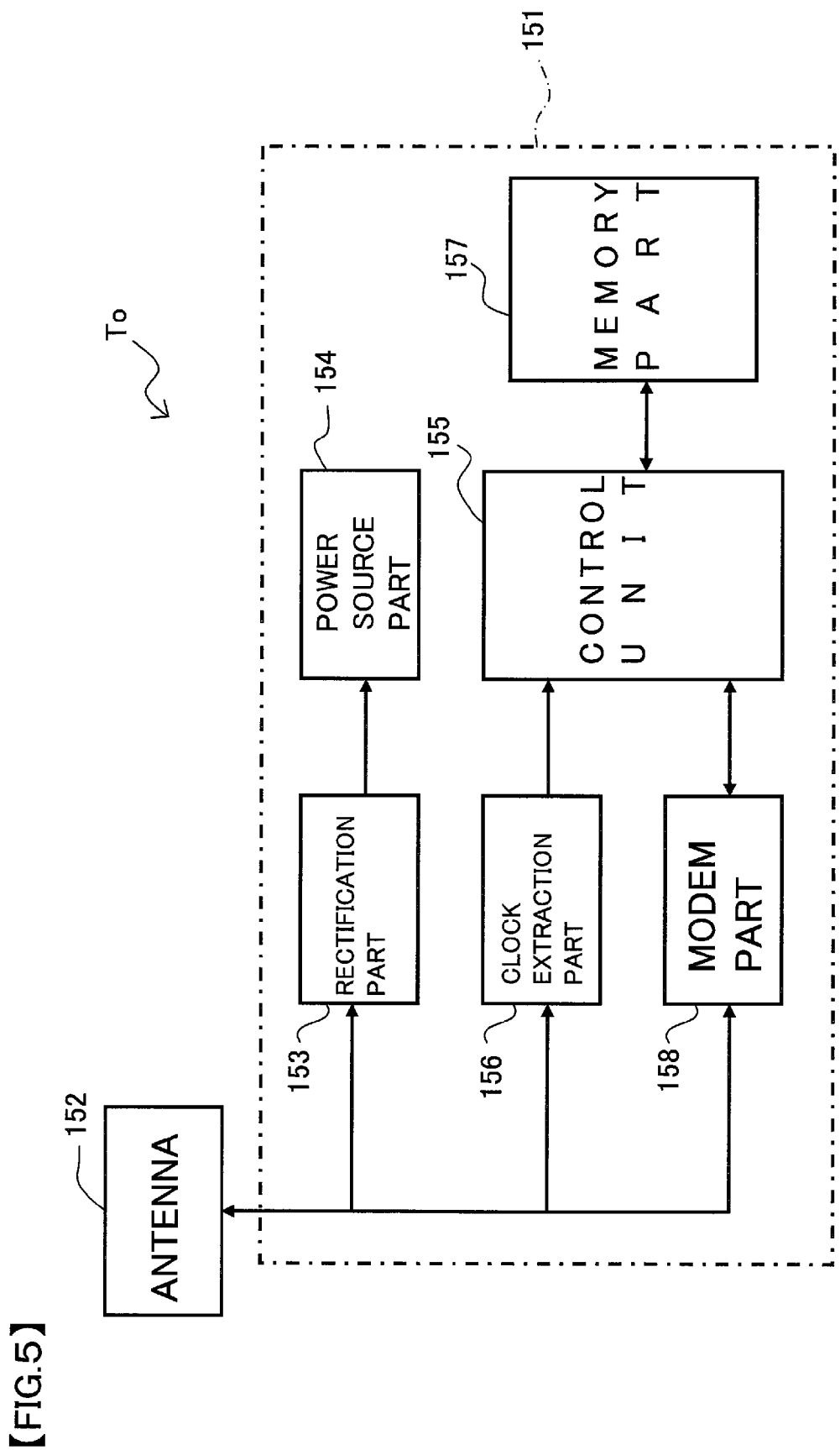
[FIG.5]

[FIG.6]

| RFID LABEL TYPE |
|---|
| 915MHz, 100mm×36mmTAG |

| PRINT LETTER |
|---|
| R F − I D |

| ACCESS ID |
|---|
| 1 6 , 7 7 7 , 2 1 5 |

| COMMODITY INFORMATION |
|---|
| 1 3 1 , 0 7 1 |

| SERVER INFORMATION |
|---|
| 2 , 0 9 7 , 1 5 1 |

[FIG.7]
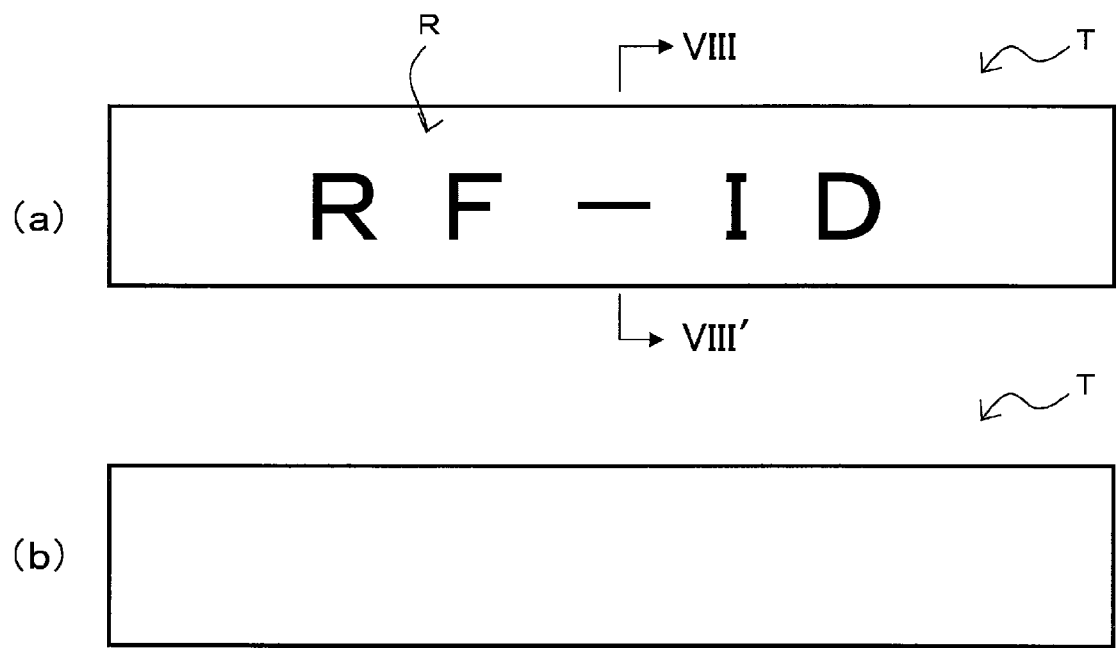

[FIG.8]
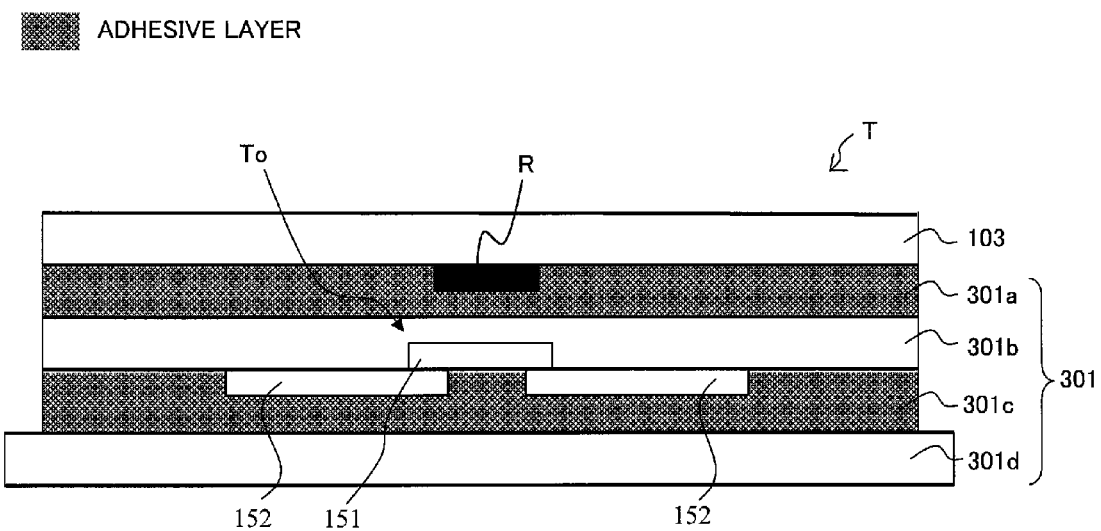

[FIG.9]
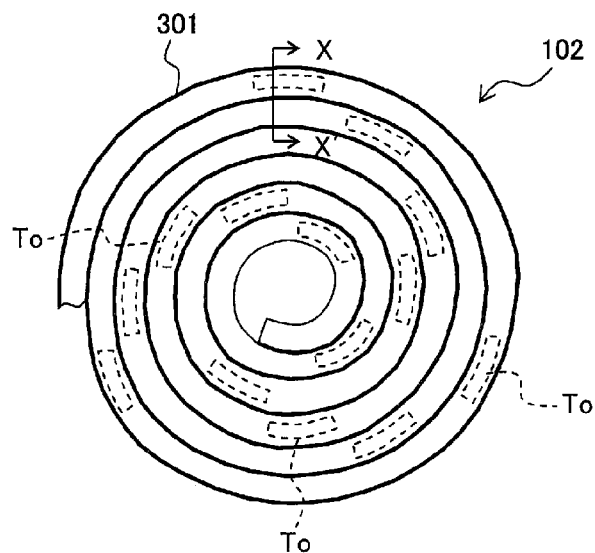
[FIG.10] ADHESIVE LAYER
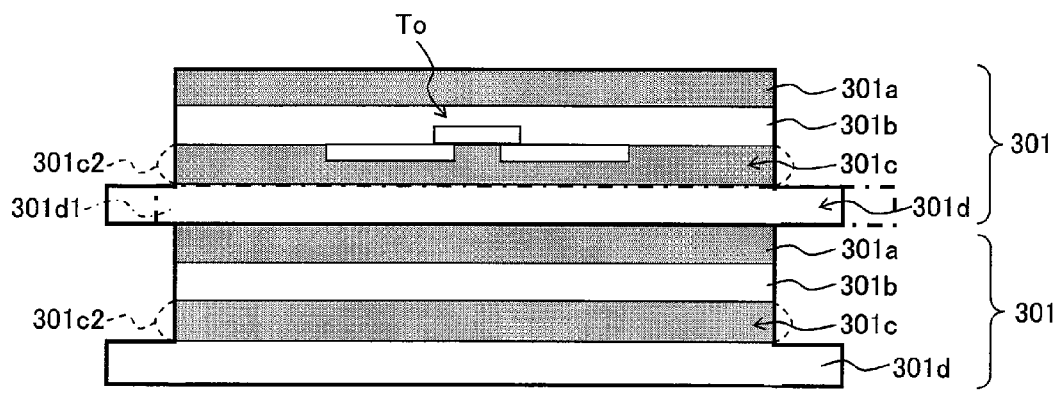
[FIG.11] ADHESIVE LAYER
COMPARATIVE EXAMPLE
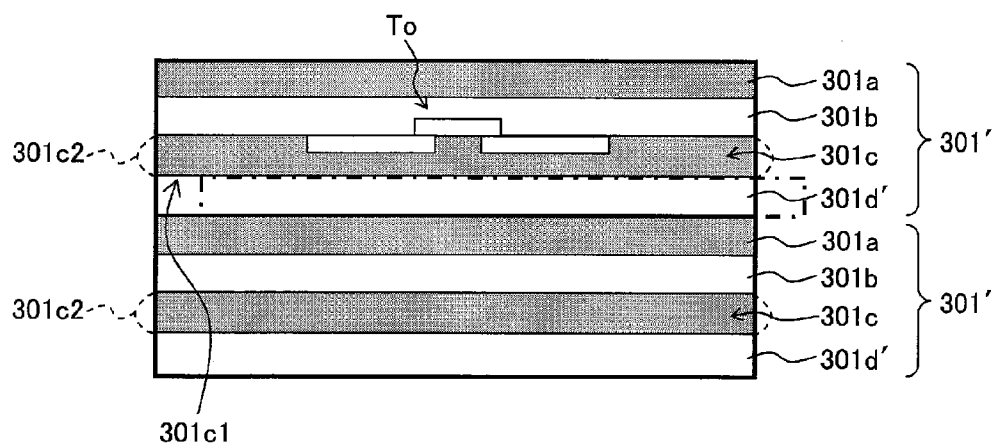

[FIG.12] ADHESIVE LAYER
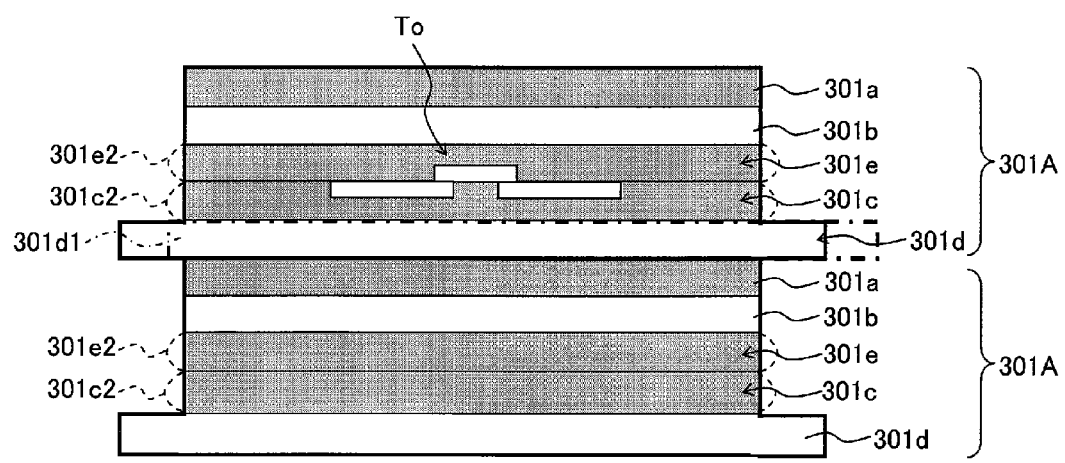

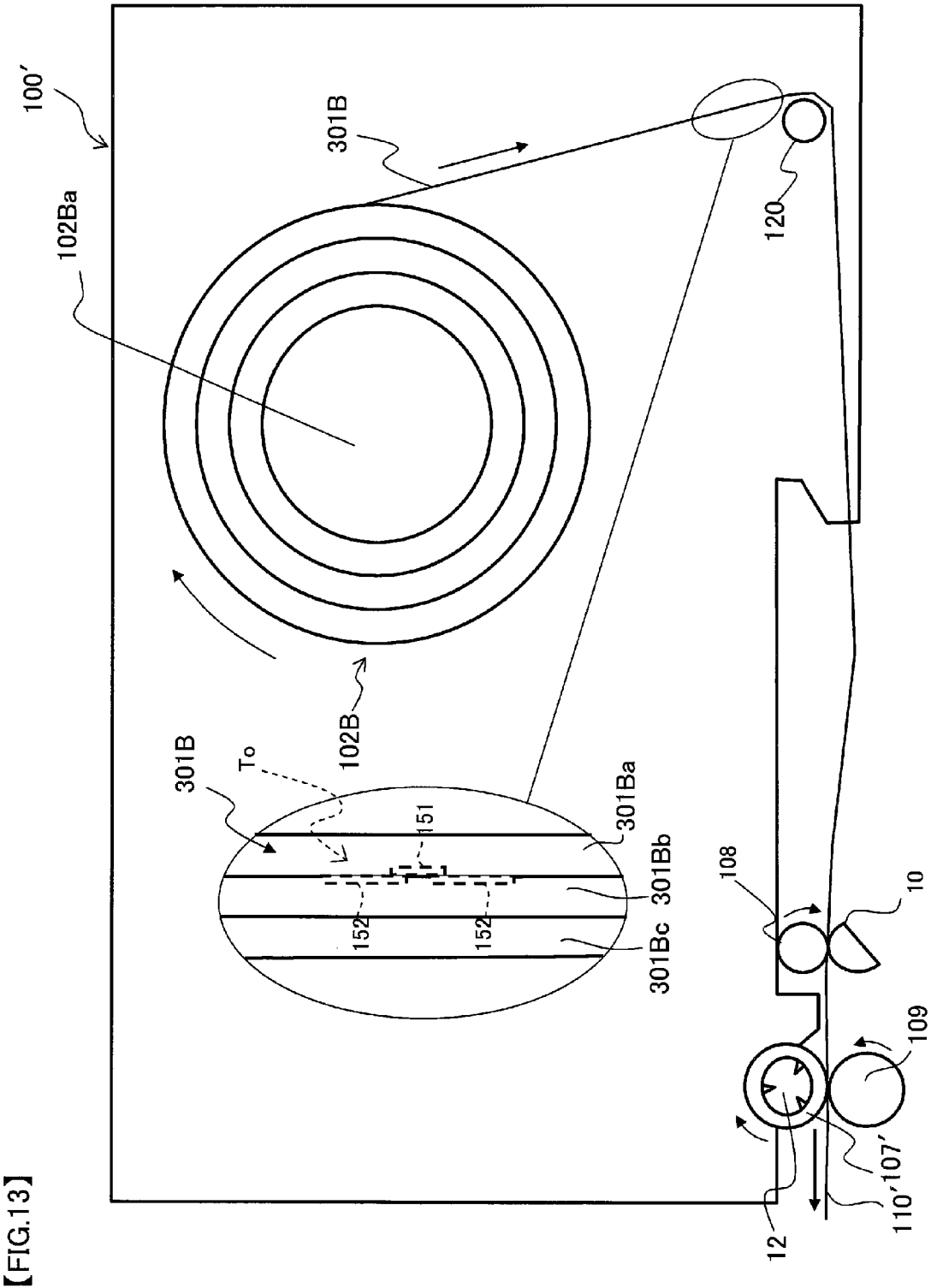
[FIG.13]

[FIG.14]
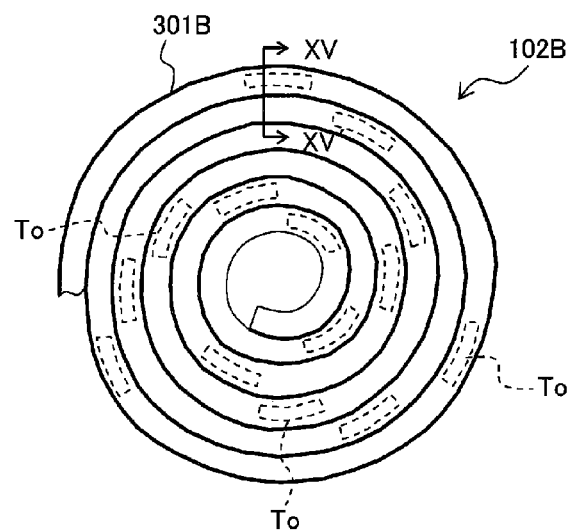
[FIG.15] ADHESIVE LAYER
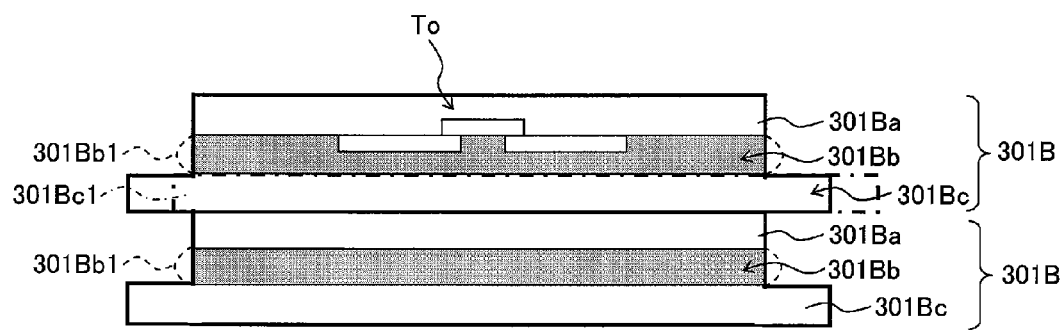
[FIG.16] ADHESIVE LAYER
COMPARATIVE EXAMPLE
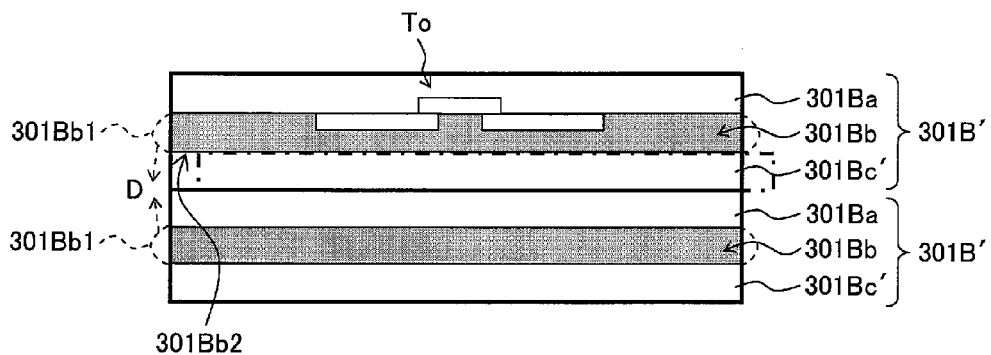

[FIG.17]
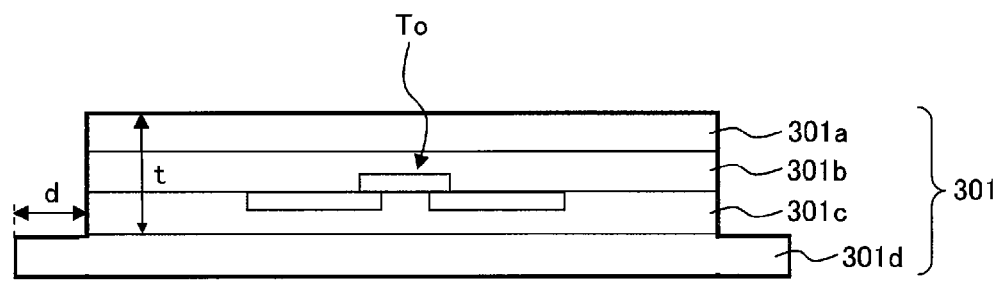

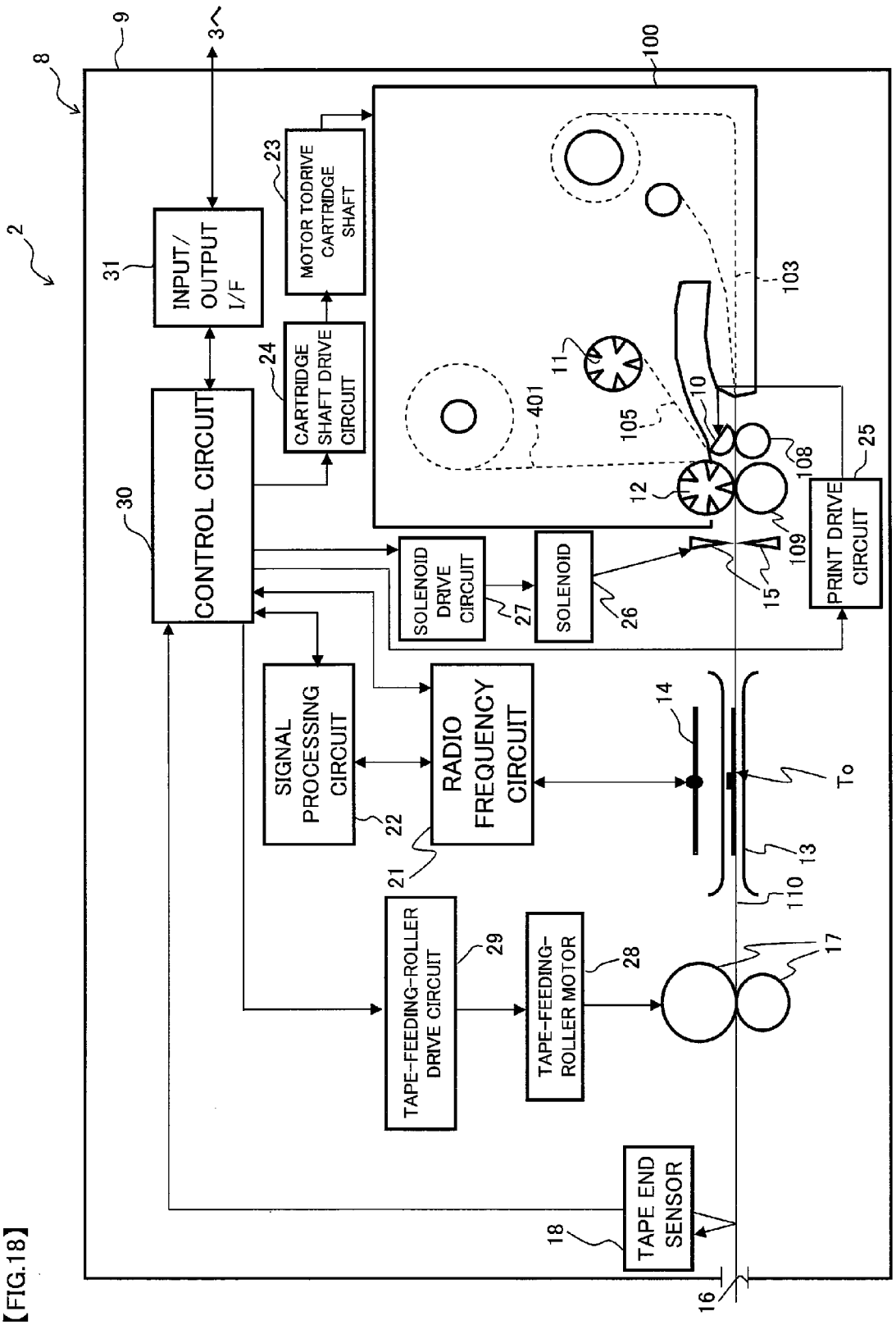
[FIG.18]

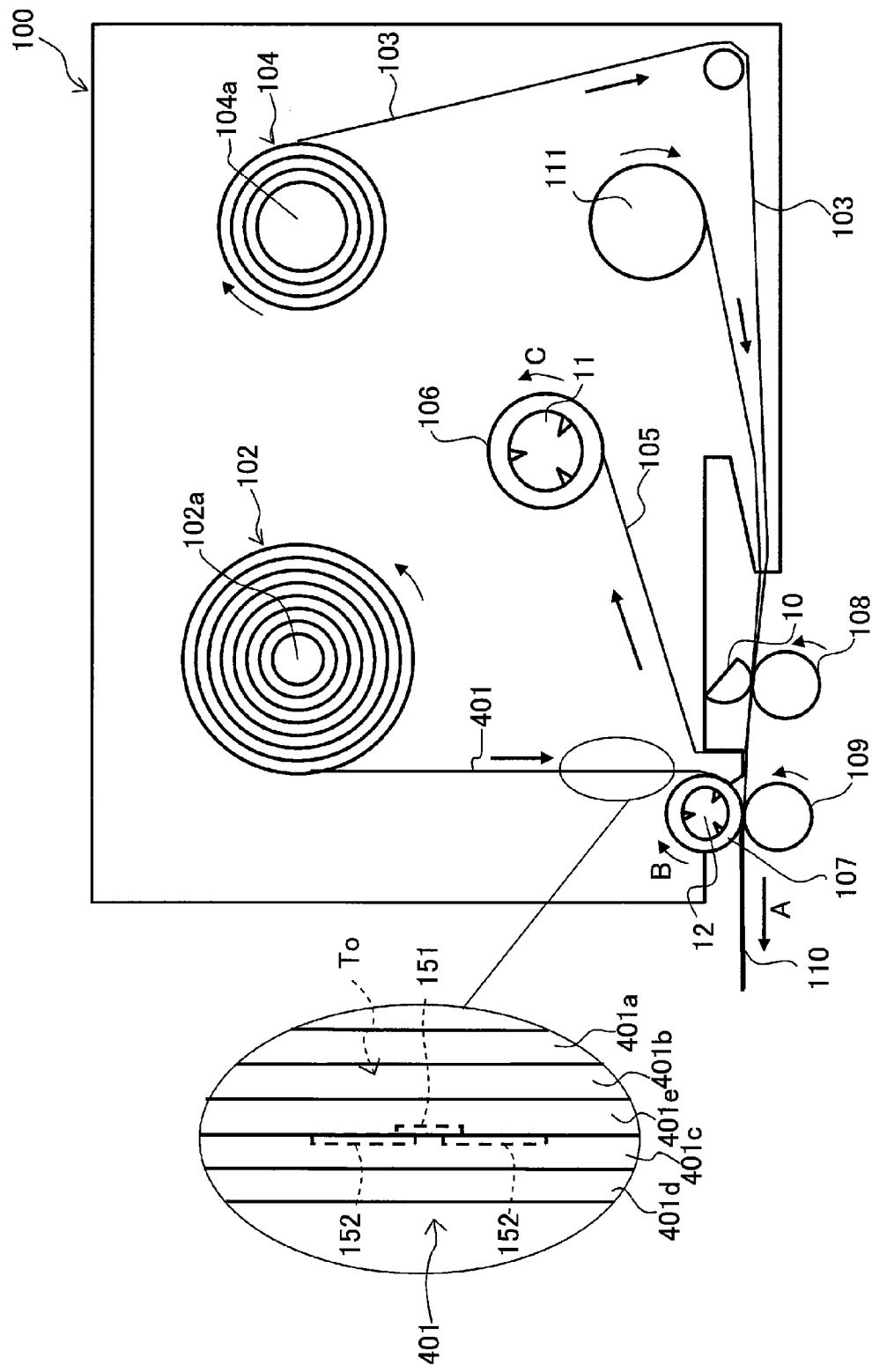

[FIG.20]
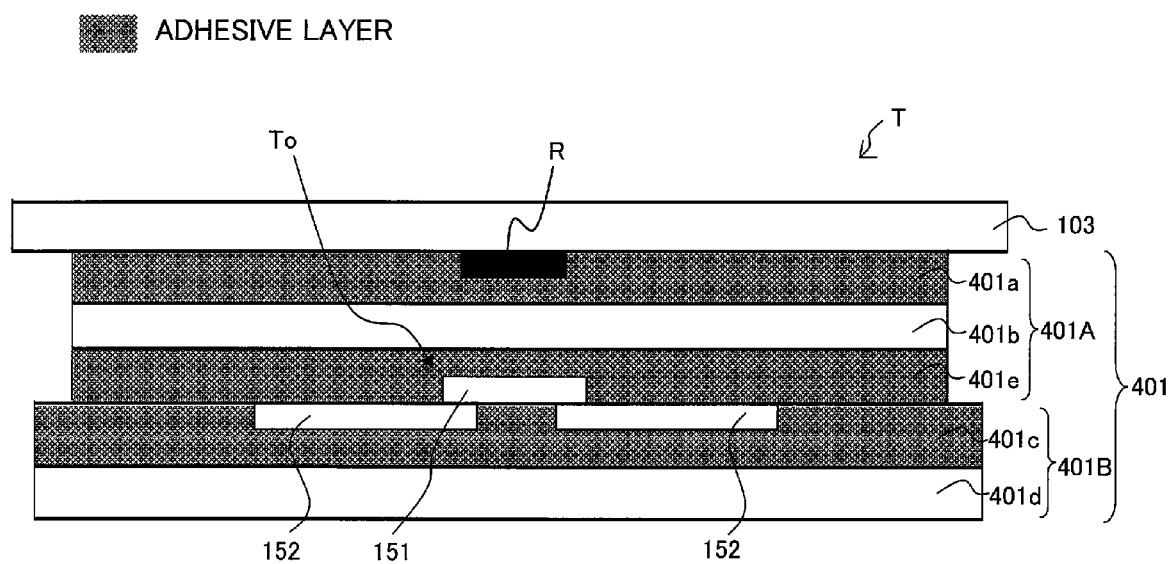

[FIG.21]
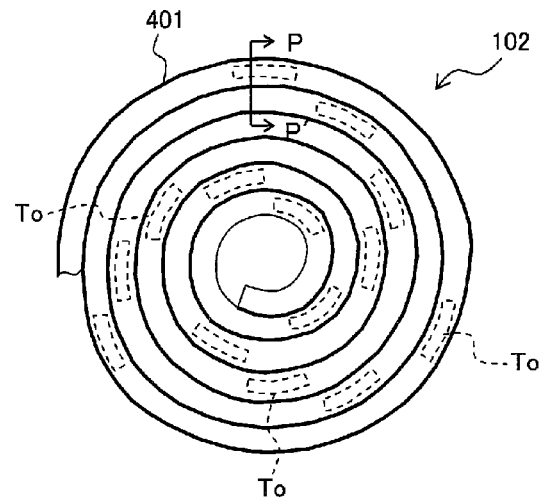
[FIG.22]
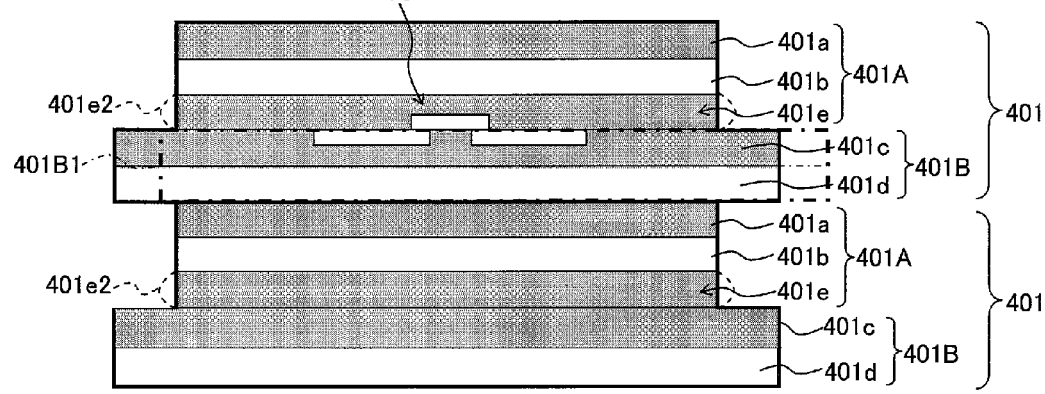
[FIG.23]
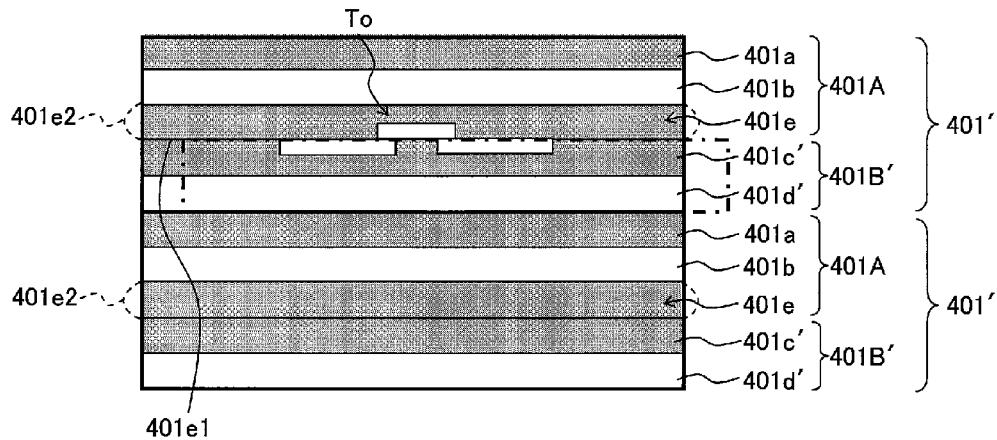

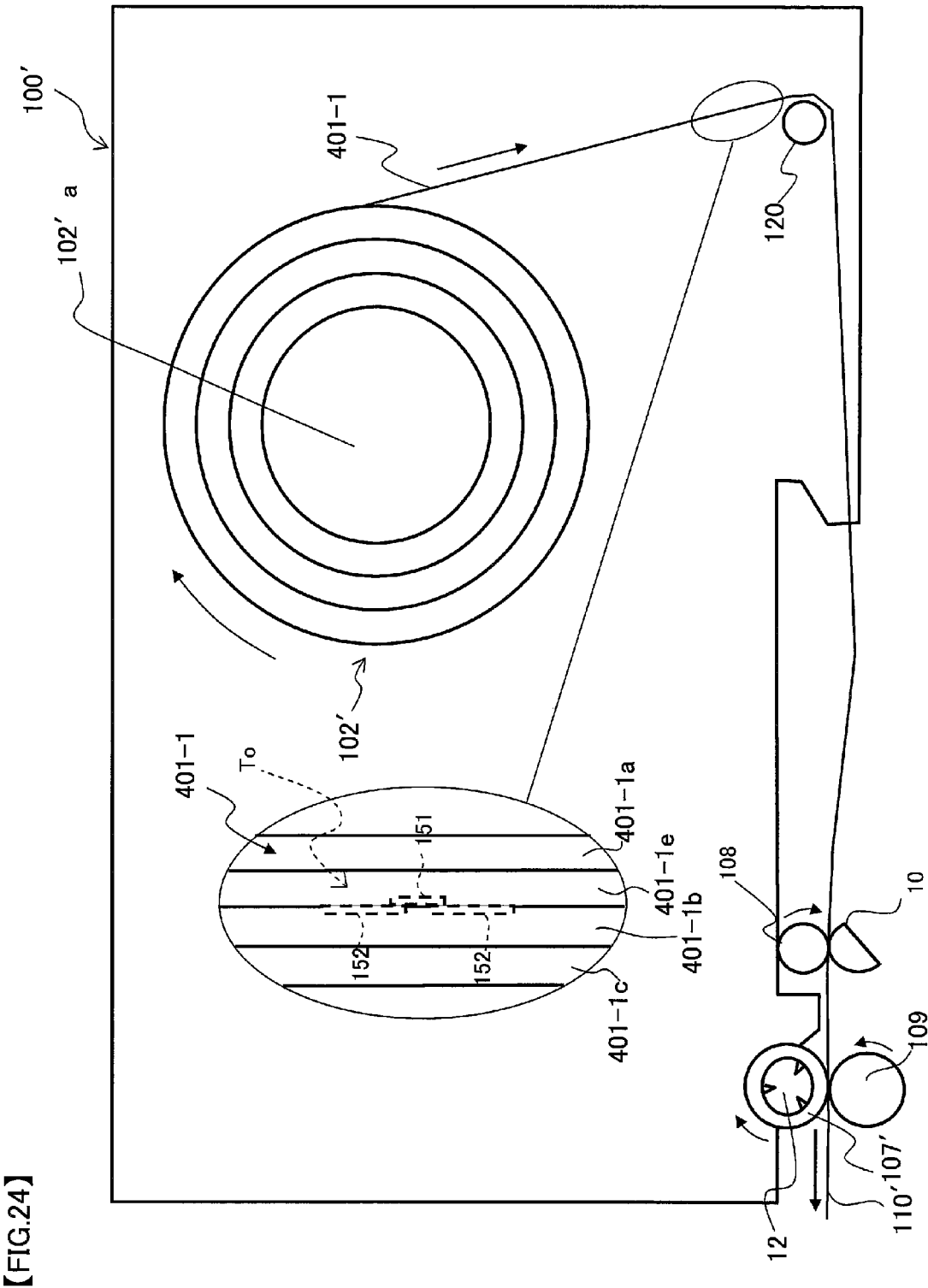

[FIG.25]
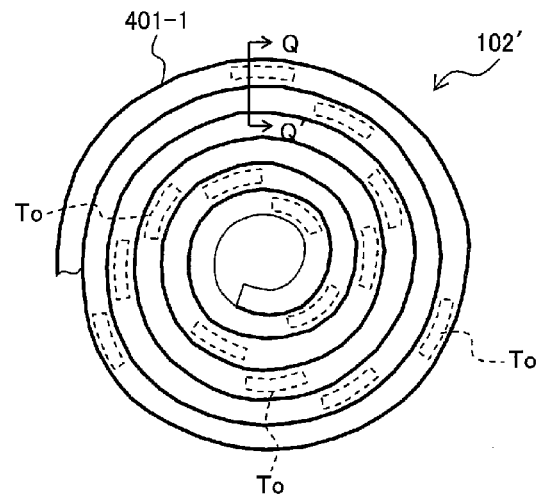
[FIG.26] ADHESIVE LAYER
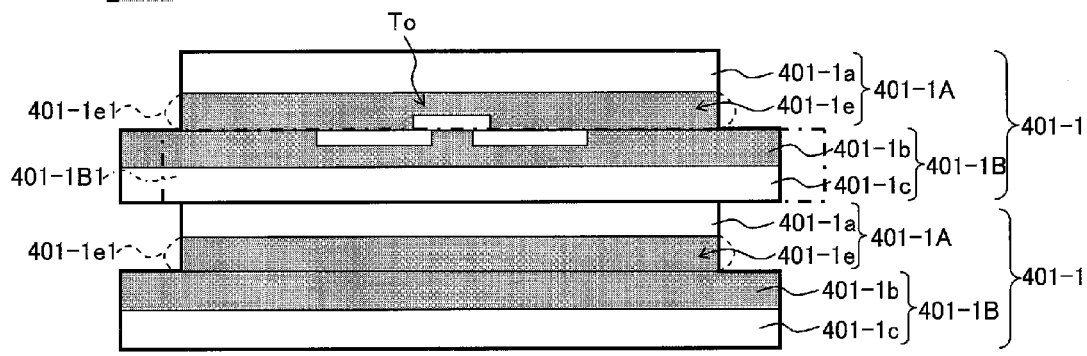
[FIG.27] ADHESIVE LAYER
COMPARATIVE EXAMPLE
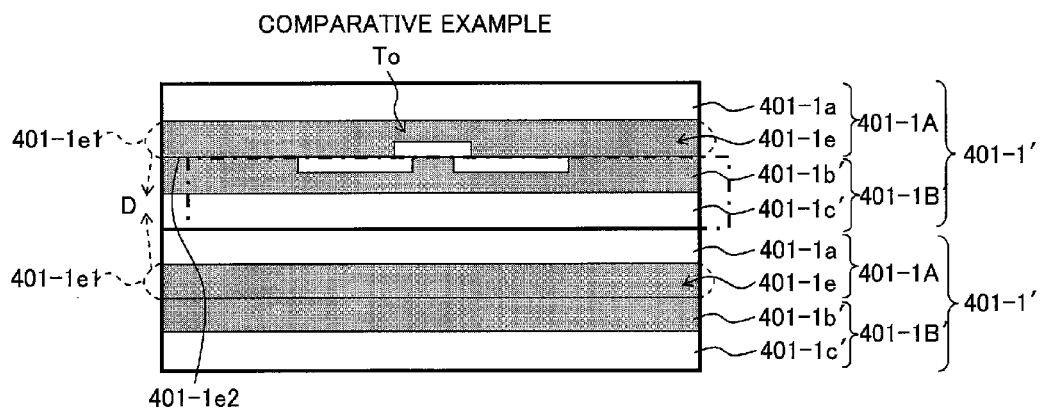

[FIG.28] ADHESIVE LAYER
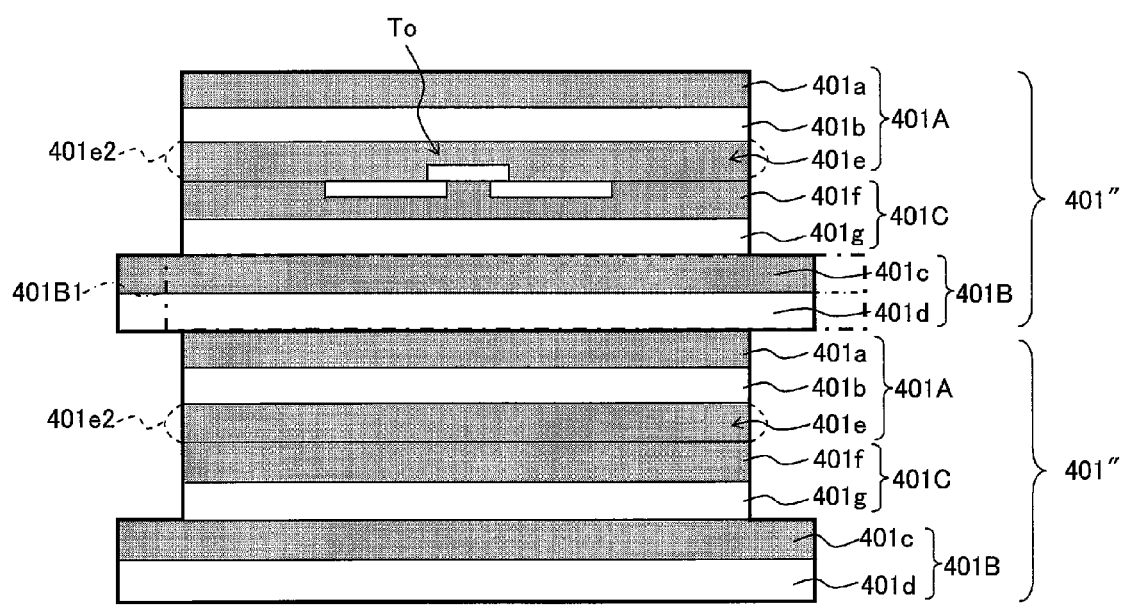

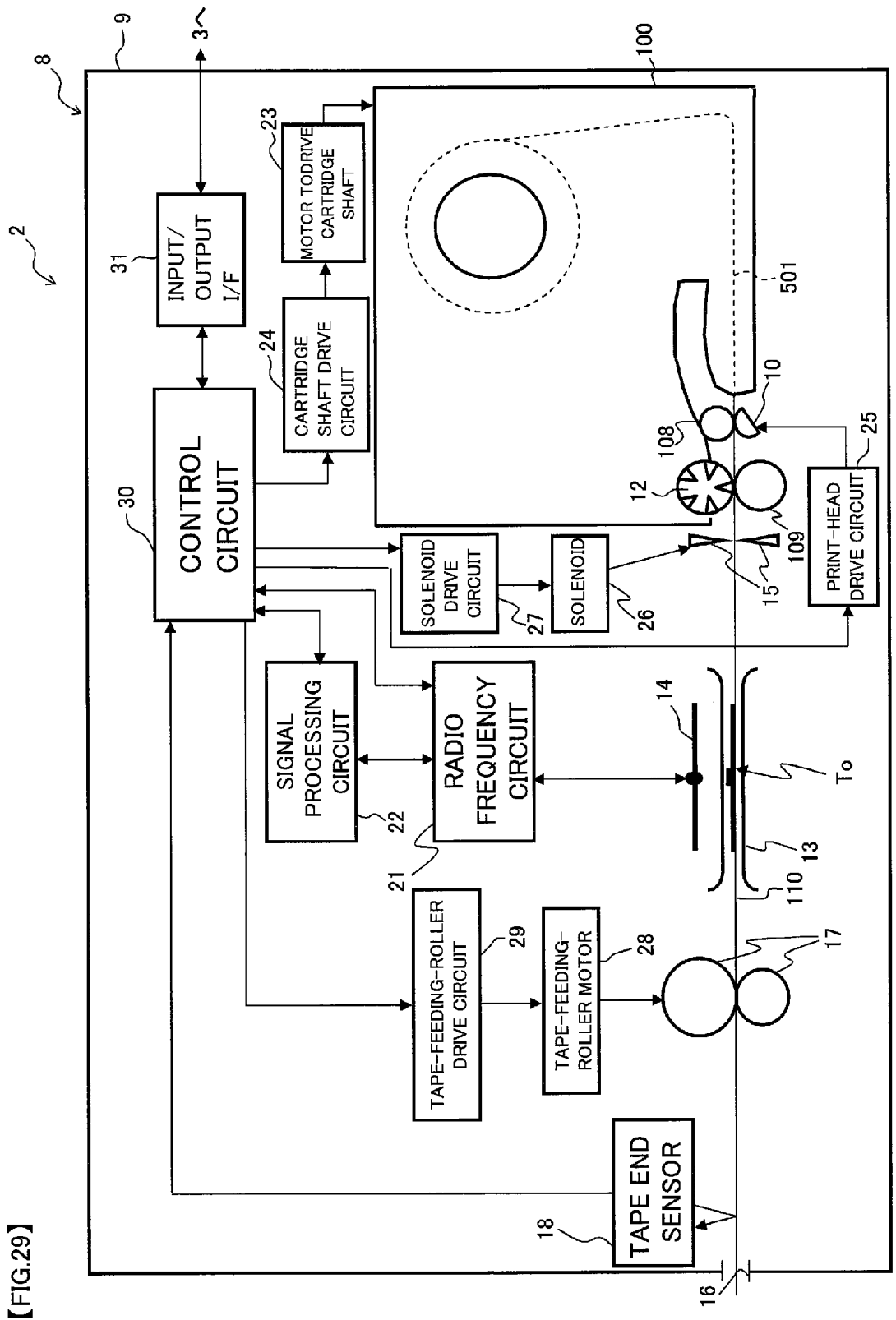
[FIG.29]

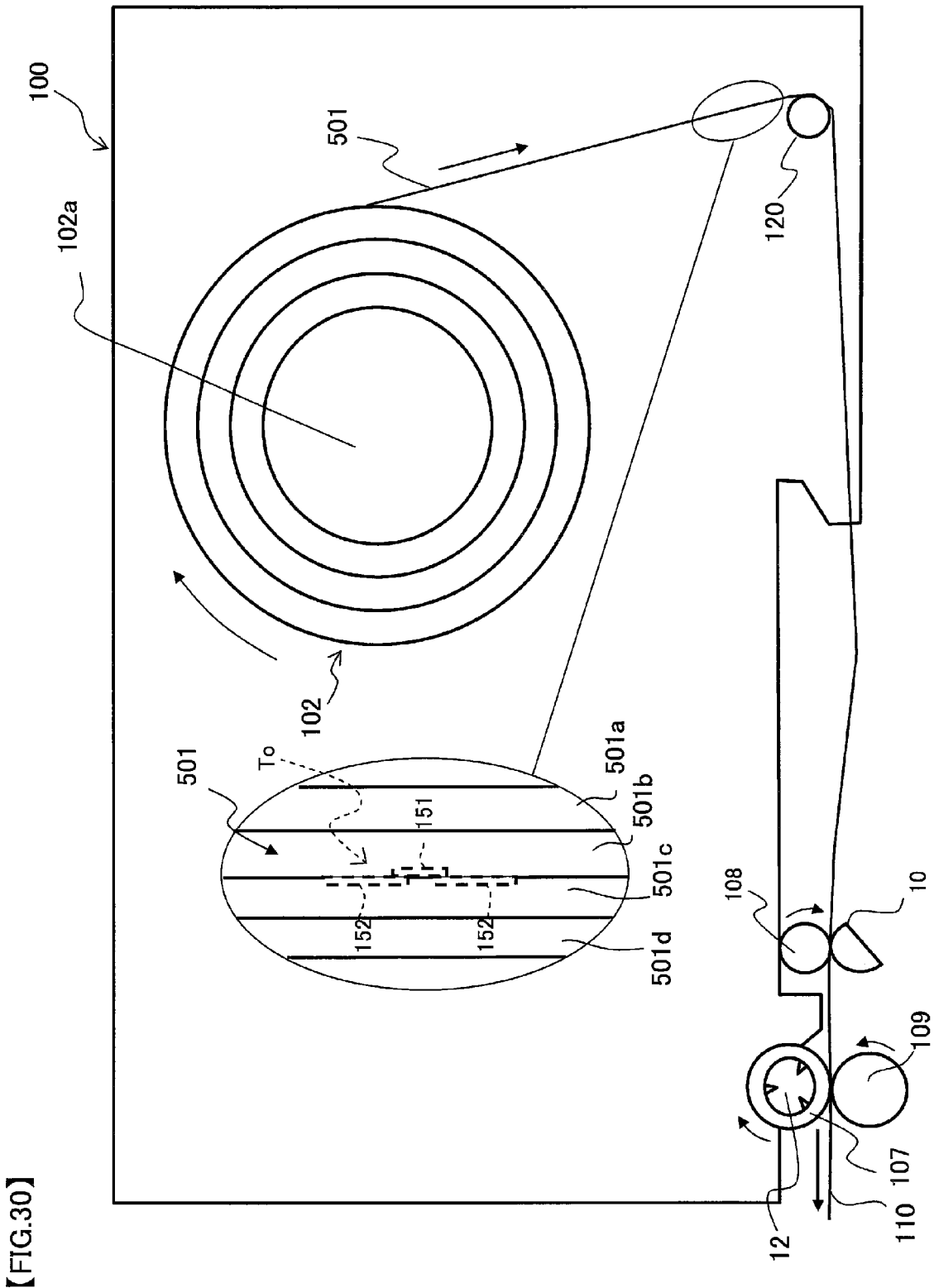
[FIG.30]

[FIG.31]
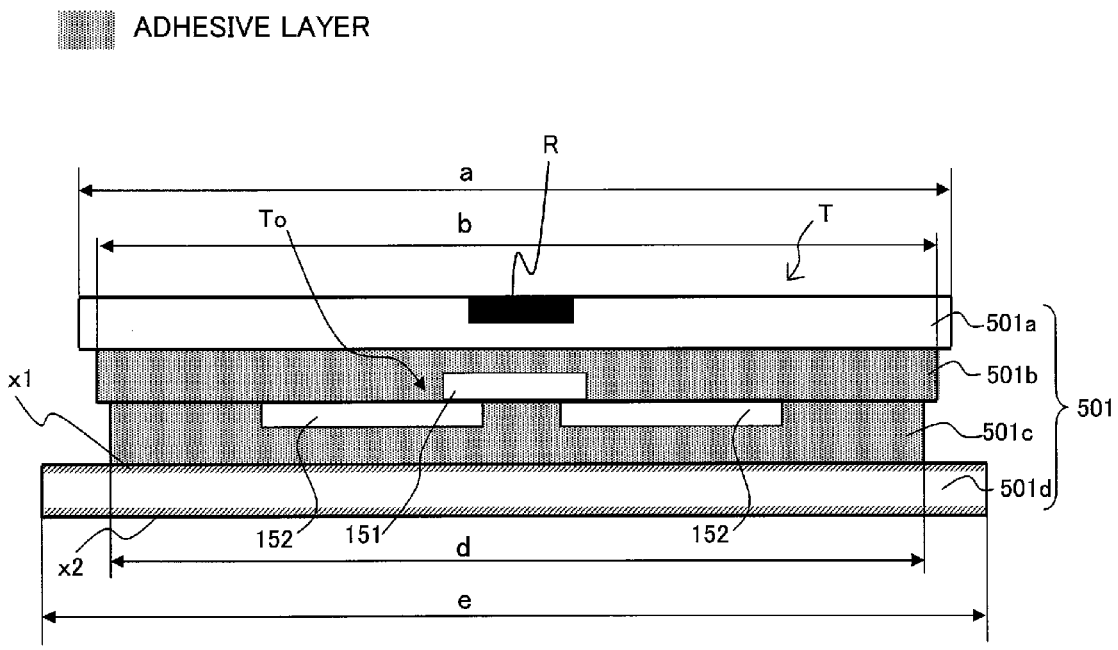

[FIG.32]
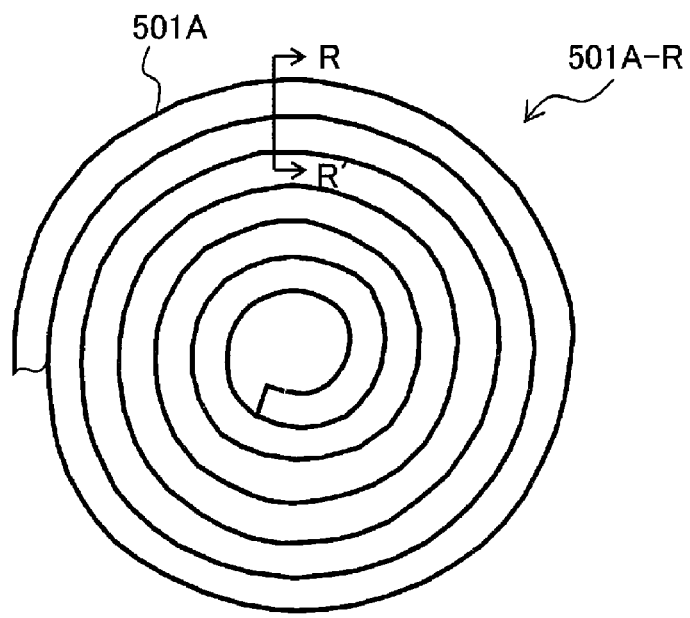

[FIG.33]
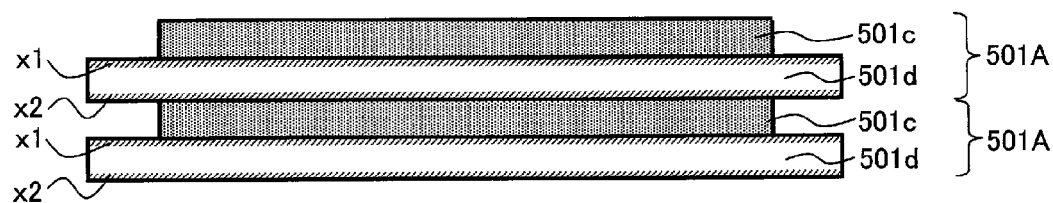

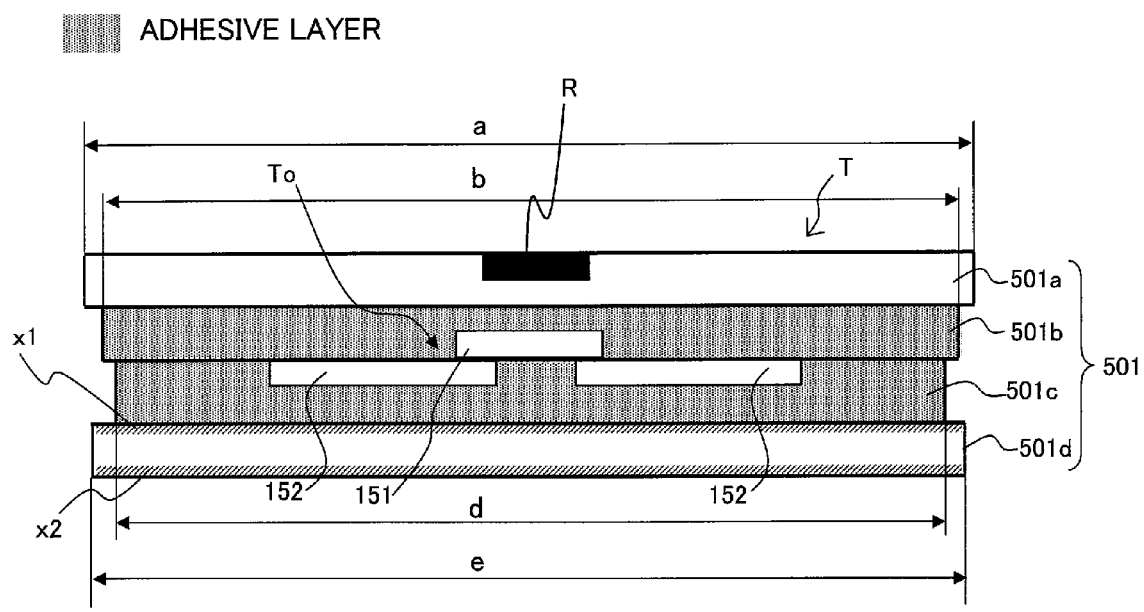
[FIG.34]

[FIG.35]
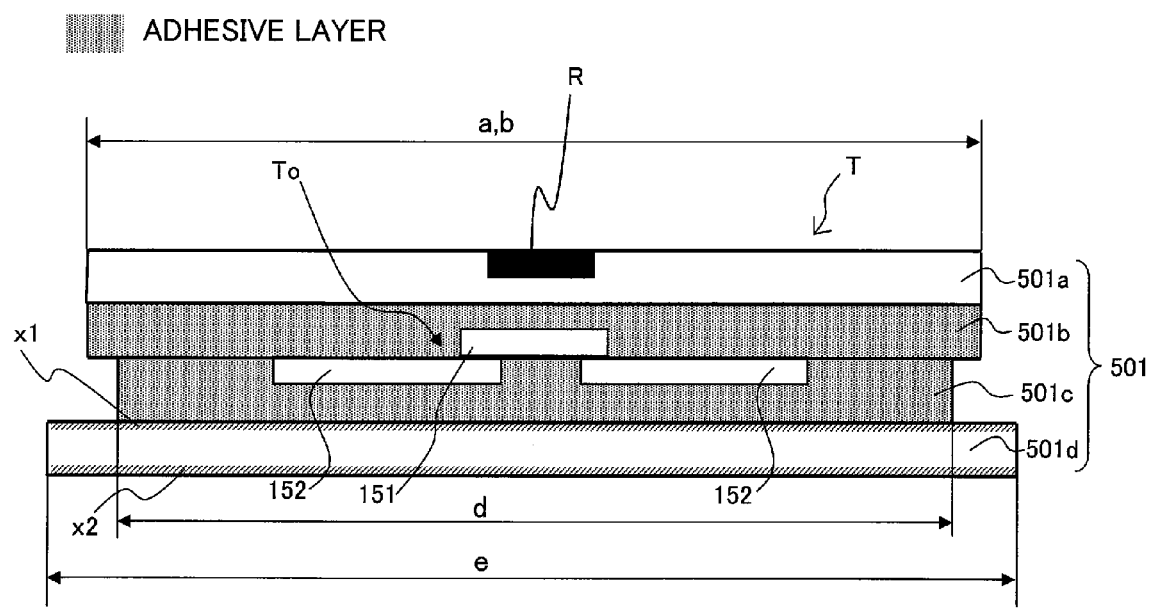

[FIG.36]
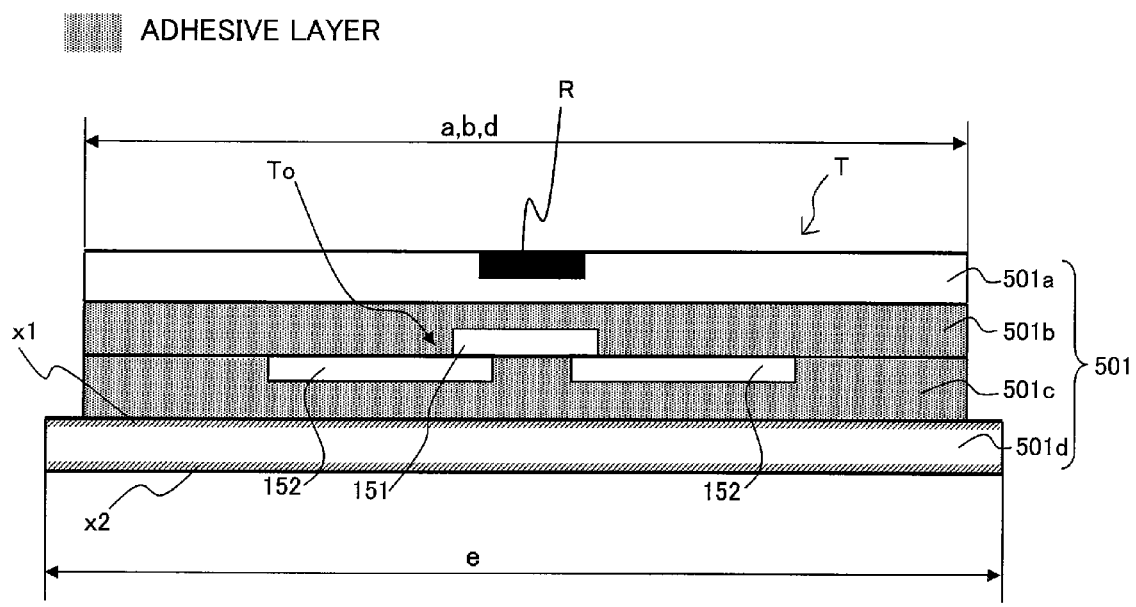

[FIG.37A]
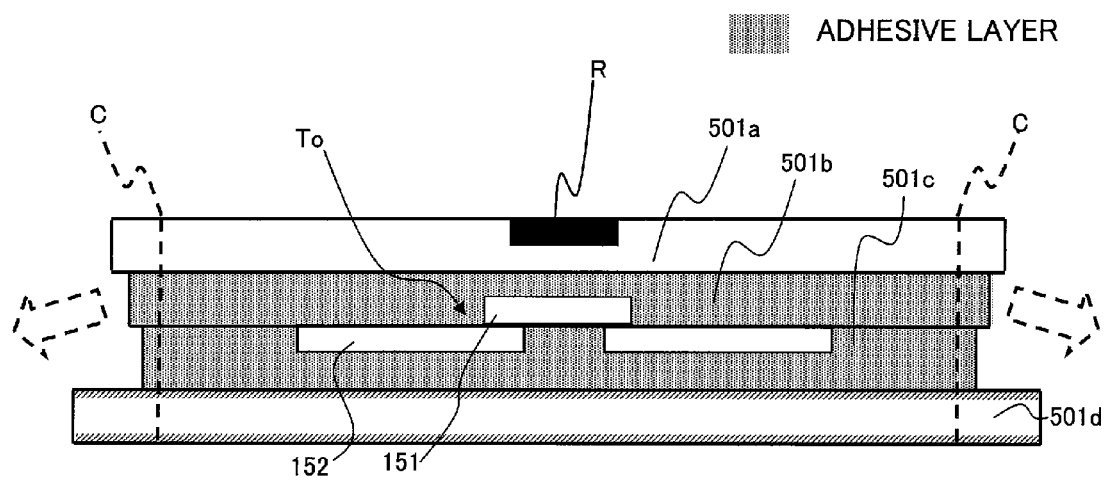
[FIG.37B]
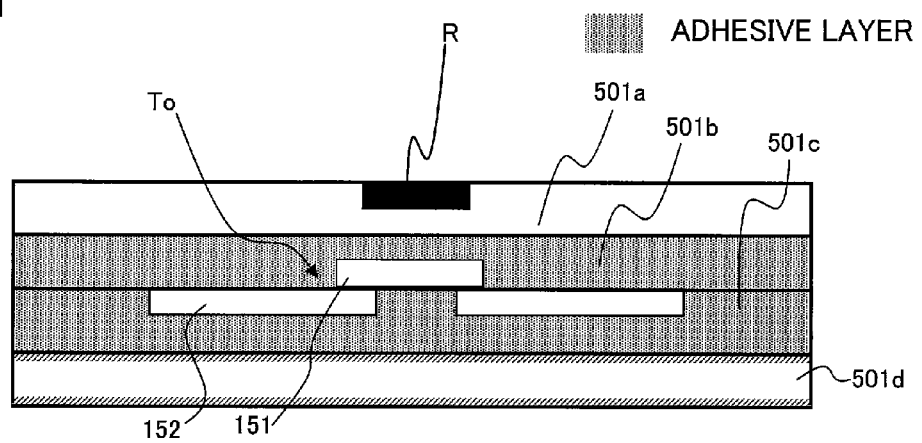

[FIG.38A]
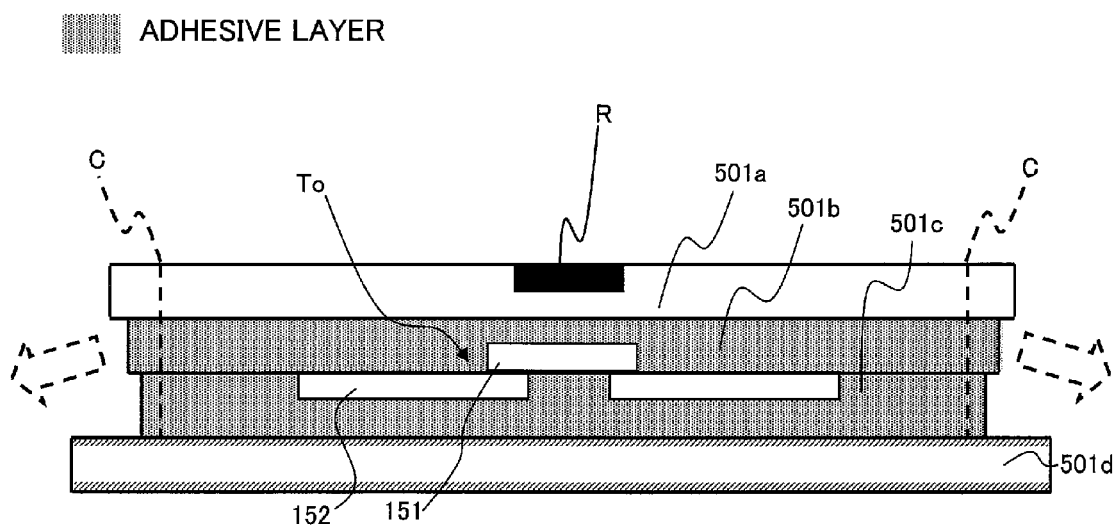
[FIG.38B]
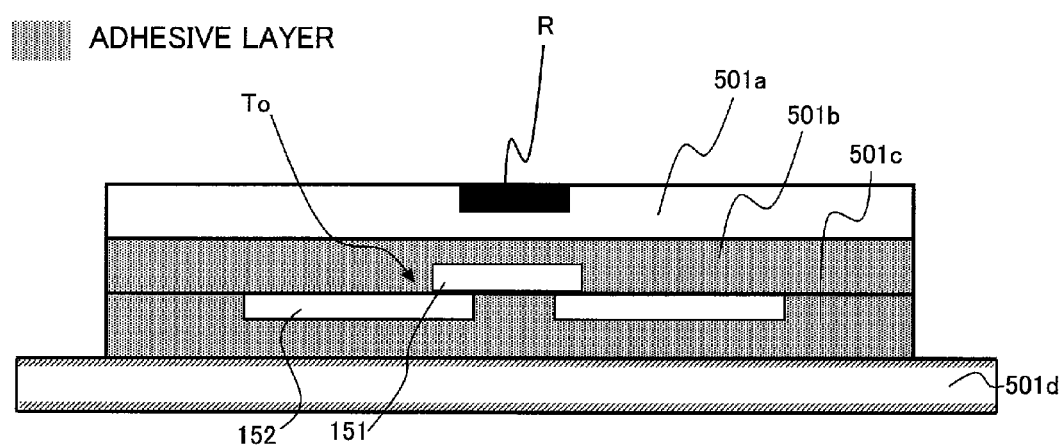

[FIG.39A]
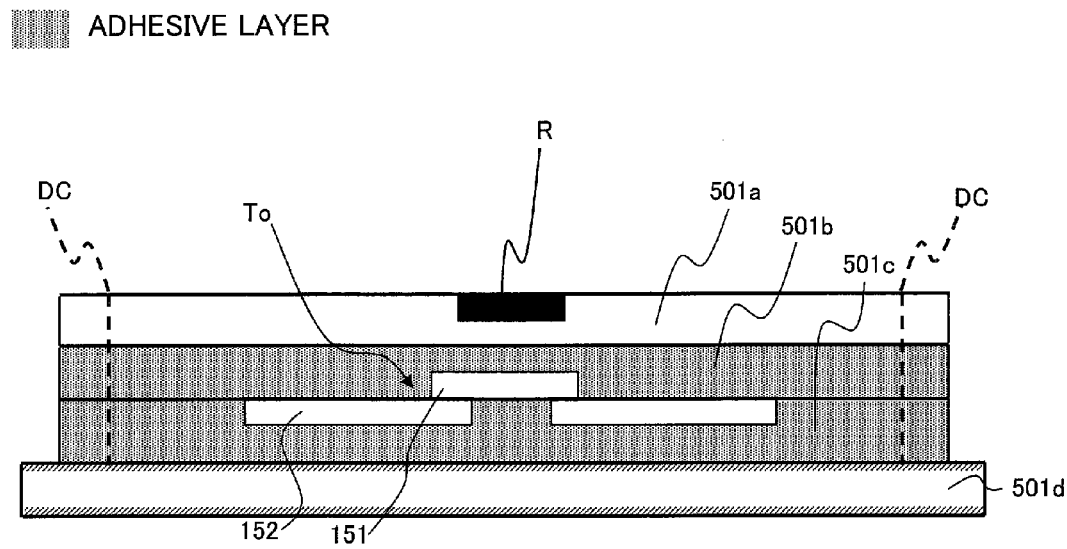
[FIG.39B]

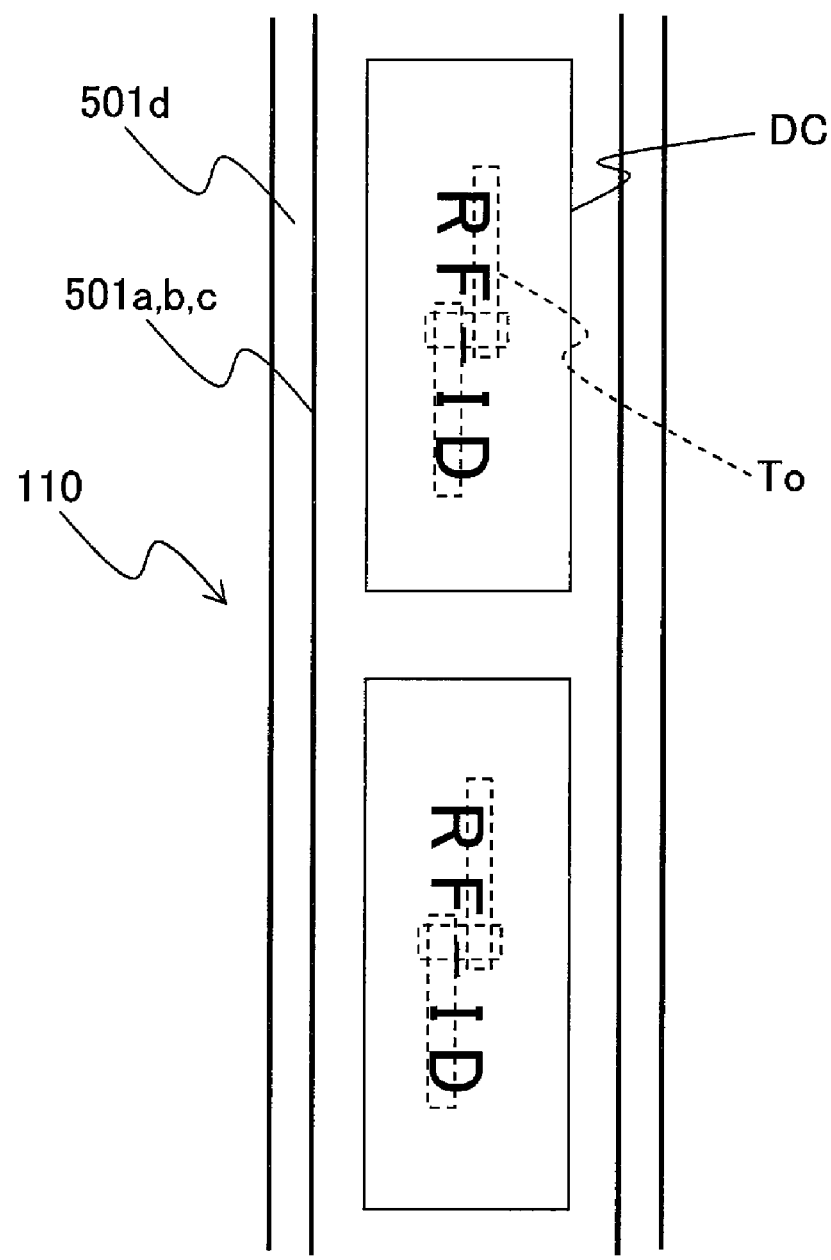
[FIG.40]

ROLL OF TAPE WITH RFID TAG, TAG TAPE, AND CARTRIDGE FOR INCLUDING AT LEAST A RFID TAG

CROSS-REFERENCE TO RELATED APPLICATION

This is a continuation-in-part (CIP) application of International Patent Application No. PCT/JP2005/19932, filed Oct. 28, 2005, which was not published under PCT article 21(2) in English and which claims the benefits of Japanese Patent application No. 2004-321431 filed Nov. 5, 2004, No. 2004-339022 filed Nov. 24, 2004, and No. 2004-339023 filed Nov. 24, 2004, each of which is incorporated herein by reference.

BACKGROUND OF THE INVENTION

1. Field of the Invention

The present invention relates to a roll of tape with RFID tag for continuously producing a RFID tag in a tape state capable of wireless communication of information with the outside, a tag tape used for the same, and a cartridge for including at least a RFID tag provided with the same.

2. Description of the Related Art

A tape printing apparatus (label producing apparatus) storing a tape to be a print-receiving material in a roll state within a cartridge (cassette) and printing desired characters on it and discharge it in a label shape while feeding out the tape from the roll has been conventionally already proposed (Patent Document 1, for example).

Such prior art is designed to provide a roll wound with a recording tape (print-receiving tape) including an adhesive layer on one side, carry out predetermined print on the print-receiving tape while feeding out the print-receiving tape from this roll, and produce a print label by cutting this to a predetermined length. Also, a separation sheet (separation material) is affixed so as to cover an adhesive layer on one side of the print-receiving tape, and by separating this separation material so as to expose the adhesive layer, the print label can be easily affixed to a target to be affixed.

Patent Publication 1: JP, A, 2002-53248 (FIGS. 1 to 5)

Recently, a RFID (Radio Frequency Identification) System for reading/writing information contactlessly between a small-sized tag provided with a RFID circuit element and a reader (reading device)/writer (writing device) has drawn attention. Even if the tag is dirty or disposed at an invisible position, an access (reading/writing of information) from the reader/writer side to the RFID circuit element provided to the tag is possible, and practical applications in various fields such as merchandise control, inspection process and the like are expected.

If information relating to its RFID tag information is printed on a label as with the prior art separately from the tag information stored inside in this type of tag and the tag is used as a RFID label with print, it would be convenient since the related information can be visually checked by users.

As a tape structure for producing this type of tag label, an adhesive layer coated by the separation material is made relatively thick, a RFID circuit element is disposed in the thick adhesive layer so as to form a tag tape, and this tape is wound to produce a roll of tape with RFID tag.

At manufacture of such a roll of tape with RFID tag, from the view of eliminating a waste of the RFID circuit element and preventing cost increase, the adhesive layer of the tag tape produced with a predetermined width in advance is coated by a separation material with the same width while the RFID circuit element is interposed therebetween, and they are wound as a pair in a radial direction in many layers. However, in this case, when the adhesive layer of the tag tape is coated by the separation material, even if they are positioned so that their center positions in the widthwise direction coincide with each other, there is a possibility that the center positions are displaced from each other to some degree due to an accuracy of a device for carrying out the work.

Since the adhesive layer is relatively thick due to the above insertion disposal of the RFID circuit element, when the separation material is bonded to the tag tape side, there is a possibility that the thick adhesive in a large quantity protrudes outward to some degree from the end portions of the tape in the widthwise direction. If the above displacement of the center positions occurs between the tag tape and the separation material in the state where the adhesive protrudes outward from the end portions in the widthwise direction of the tape, a part of the adhesive layer which should have been coated by the separation material (edge portion in the widthwise direction) is not coated by the separation material any more, and as a result, there is a possibility that the adhesives protruding from the edge portion in the widthwise direction as above stick to each other (wrong adhesion between the adhesives) in a layer and another layer adjacent thereto in the radial direction. Also, if the adhesive protrudes from the end portion of the tape in the widthwise direction as above, there is also a possibility that the protruding portion is brought into contact with a side wall surface of a roll disposal portion and sticks thereto (wrong adhesion to the side wall). In the case of occurrence of these phenomena, there is a possibility that the tag tape can not be easily fed out from the roll of tape with RFID tag.

On the other hand, as a tape structure for producing a tag label other than the above, an adhesive layer between the separation material and a print-receiving tape is made relatively thick (it is preferable to make it at least thicker than the thickness of the RFID circuit element in order to maintain its flatness), a tag tape is formed by disposing the RFID circuit element in the thick adhesive layer, and the tape is wound so as to produce a roll of tape with RFID tag.

At manufacture of this type of roll of tape with RFID tag from the view of eliminating a waste of the RFID circuit element and preventing cost increase, such a method is being examined that on one side of a base tape produced with a predetermined width in advance by fixing a RFID circuit element on a tape base layer through an adhesive layer for mounting, a separation layer (=separation tape) with an adhesive (=affixing adhesive) produced with the same width is affixed, and they are wound as a pair in a radial direction in many layers (after the separation layer with an adhesive is affixed to the tape base layer side once, the affixing adhesive adheres to the fixing adhesive side and only the separation material becomes capable of being separated). However, also in this case, when the one side of the base tape is coated by the separation tape as above, even if they are positioned such that their center positions in the widthwise direction coincide with each other as above, there is a possibility that displacement in the center positions occurs to some degree due to the accuracy of the device for carrying out the work.

Here, since the adhesive layer (the adhesive layer for mounting and the adhesive layer for affixing) becomes relatively thick due to the above insertion disposal of the RFID circuit element, when the separation tape is bonded to the base tape side, there is a possibility that the thick adhesive in a large quantity protrudes outward to some degree from the end portions of the tape in the widthwise direction. If the above displacement of the center positions occurs between the base tape and the separation tape in the state where the adhesive protrudes from the tape outward in the widthwise direction, a part of the adhesive layer for mounting which should have been coated by the separation tape (edge portion in the widthwise direction) is not coated by the separation tape any more, and as a result, there is a possibility that the fixing adhesives protruding from the edge portion in the widthwise direction as above stick to each other (wrong adhesion between the adhesives) in a base tape and another base tape adjacent thereto in the radial direction. Also, if the fixing adhesive protrudes from the end portion of the tape in the widthwise direction as above, there is also a possibility that the protruding portion is brought into contact with the side wall surface of the roll disposal portion in the cartridge and sticks thereto (wrong adhesion to the side wall). In the case of occurrence of these phenomena, there is a possibility that the tag tape can not be easily fed out from the roll of tape with RFID tag.

Also, as another method for manufacturing a roll of tape with RFID tag forming a tag tape by disposing a RFID circuit element in such a thick adhesive layer, from the view of the above, such a method is being examined that on one side of a base tape produced with a predetermined width in advance with an adhesive layer for mounting (adhesive layer for mounting) on the base layer, a separation tape made of an adhesive layer for affixing (adhesive layer for affixing) and a separation layer is affixed while the RFID circuit element is interposed, and they are wound as a pair in a radial direction in many layers (after the separation tape is affixed to the base layer once, the adhesive layer for affixing adheres to the adhesive layer for mounting side and only the separation material becomes capable of separation).

In this case, a tag tape in a five-layered bonding structure of a base layer, an adhesive layer for mounting, a RFID circuit element, an adhesive layer for affixing, and a separation layer is completed, and a tag label is produced using it and offered for use. However, since this is a structure that two adhesive layers are interposed in this way, if the adhesive layer for mounting or the adhesive layer for affixing protrudes in the widthwise direction from the base layer or the separation layer, there might be a nonconformity of wrong adhesion of an adhesive to a hand when a user handles the tag tape or the tag label, wrong adhesion to another commodity at affixing, or adhesion of dusts or stains to the protruding adhesive.

Also, when the base tape and the separation tape are to be bonded together as mentioned above, it is being examined that the base tape wound into a base tape roll and the separation tape wound into a separation tape roll are actually bonded together while they are fed out from the respective rolls. At this time, since lamination is made in the order of a base layer, an adhesive layer for mounting, a base layer, an adhesive layer for mounting and the like in the base tape roll, the adhesive layer for mounting would adhere to the surface of the base layer. Thus, it is necessary to separately interpose a tape for preventing this adhesion. Also, in the separation tape roll, lamination is made in the order of an adhesive layer for affixing, a separation layer, an adhesive layer for affixing, a separation layer and the like, and it is necessary to separately interpose a tape for preventing adhesion of the adhesive layer for affixing to the surface of the separation layer as above. There is a need to prepare a tape for preventing adhesion both for the base tape and the separation tape in the rolled state, which makes manufacturing work cumbersome.

SUMMARY OF THE INVENTION

A first object of the present invention is to provide a roll of tape with RFID tag, a tag tape and a cartridge for including at least a RFID tag which can prevent wrong adhesion due to protrusion of an adhesive.

A second object of the present invention is to provide a roll of tape with RFID tag, a tag tape and a cartridge for including at least a RFID tag which can prevent wrong adhesion due to protrusion of an adhesive and enables favorable feeding-out of the tag tape.

A third object of the present invention is to provide a roll of tape with RFID tag, a tag tape and a cartridge for including at least a RFID tag which can prevent wrong adhesion due to protrusion of an adhesive and complication of work at manufacture.

BRIEF DESCRIPTION OF THE DRAWINGS

FIG. 1 is a system configuration diagram illustrating a RFID tag manufacturing system to which an apparatus for communicating with a RFID tag provided with a cartridge for including at least a RFID tag including a roll of tape with RFID tag of a first embodiment of the present invention is applied.

FIG. 2 is a conceptual block diagram illustrating a detailed structure of the apparatus for communicating with a RFID tag shown in FIG. 1.

FIG. 3 is an explanatory diagram for illustrating a detailed structure of the cartridge shown in FIG. 2.

FIG. 4 is a functional block diagram illustrating a detailed function of a radio frequency circuit shown in FIG. 2.

FIG. 5 is a functional block diagram illustrating a functional arrangement of the RFID circuit element.

FIG. 6 is a view illustrating an example of a screen displayed on a terminal or a general purpose computer upon access to RFID tag information.

FIG. 7A is a top view and FIG. 7B is a bottom view illustrating an example of an appearance of the RFID label formed by the apparatus for communicating with a RFID tag provided with the cartridge for including at least a RFID tag including the roll of tape with RFID tag in the first embodiment of the present invention.

FIG. 8 is a lateral sectional view taken along the line VIII-VIII' in FIG. 7.

FIG. 9 is a conceptual side view illustrating a detailed structure of a first roll in FIG. 3.

FIG. 10 is a lateral sectional view taken along the line X-X' in FIG. 9 illustrating a laminated structure of two base tapes adjacent to each other in the radial direction of the first roll.

FIG. 11 is a lateral sectional view illustrating a laminated structure of two base tapes adjacent to each other in the radial direction of the first roll in a comparative example in which the width of a separation sheet is made approximately equal to the other layers.

FIG. 12 is a lateral sectional view illustrating a laminated structure of two base tapes adjacent to each other in the radial direction of the first roll in a variation in which an adhesive layer for mounting is provided between a base film and the RFID circuit element.

FIG. 13 is an explanatory diagram for illustrating a detailed structure of a cartridge in a variation where bonding is not carried out.

FIG. 14 is a conceptual side view illustrating a detailed structure of the first roll shown in FIG. 13.

FIG. 15 is a lateral sectional view taken along the line XV-XV' in FIG. 14 illustrating a laminated structure of two thermal tapes adjacent to each other in the radial direction of the first roll.

FIG. 16 a lateral sectional view illustrating the laminated structure of two thermal tapes adjacent to each other in the radial direction of the first roll in a comparative example in which the width of a separation sheet is made approximately equal to the other layers.

FIG. 17 is a diagram for illustrating a protruding amount of the separation sheet and the thickness of the base tape other than the separation sheet.

FIG. 18 is a conceptual block diagram illustrating a detailed structure of the apparatus for communicating with a RFID tag provided with the cartridge for including at least a RFID tag including a roll of tape with RFID tag of a second embodiment of the present invention.

FIG. 19 is an explanatory diagram for illustrating a detailed structure of the cartridge shown in FIG. 18.

FIG. 20 is a lateral sectional view illustrating the RFID label formed by the apparatus for communicating with a RFID tag provided with the cartridge for including at least a RFID tag including the roll of tape with RFID tag of the second embodiment of the present invention.

FIG. 21 is a conceptual side view illustrating the detailed structure of the first roll shown in FIG. 19.

FIG. 22 is a lateral sectional view taken along the line P-P' in FIG. 21 illustrating the laminated structure of two base tapes adjacent to each other in the radial direction of the first roll.

FIG. 23 is a lateral sectional view illustrating the laminated structure of two base tapes adjacent to each other in the radial direction of the first roll in a comparative example in which the width of a separation tape is made approximately equal to those of the other layers.

FIG. 24 is an explanatory diagram for illustrating a detailed structure of the cartridge in a variation where bonding is not carried out.

FIG. 25 is a conceptual side view illustrating a detailed structure of the first roll shown in FIG. 24.

FIG. 26 is a lateral sectional view taken along the line Q-Q' in FIG. 25 illustrating a laminated structure of two thermal tapes adjacent to each other in the radial direction of the first roll.

FIG. 27 is a lateral sectional view illustrating the laminated structure of two thermal tapes adjacent to each other in the radial direction of the first roll in a comparative example in which the width of a separation tape is made approximately equal to those of the other layers.

FIG. 28 is a lateral sectional view illustrating a laminated structure of two base tapes adjacent to each other in the radial direction of the first roll in a variation where an intermediate layer tape is provided.

FIG. 29 is a conceptual block diagram illustrating a detailed structure of the apparatus for communicating with a RFID tag provided with the cartridge for including at least a RFID tag including a tag tape of a third embodiment of the present invention.

FIG. 30 is an explanatory diagram for illustrating a detailed structure of the cartridge shown in FIG. 29.

FIG. 31 is a lateral sectional view of the RFID label formed by the apparatus for communicating with a RFID tag.

FIG. 32 is a conceptual side view illustrating a detailed structure of the separation tape roll shown in FIG. 30.

FIG. 33 is a lateral sectional view taken along the line R-R' in FIG. 32 illustrating the laminated structure of two base tapes adjacent to each other in the radial direction of the separation tape roll.

FIG. 34 is a diagram illustrating a variation with a>e.
FIG. 35 is a diagram illustrating a variation with a≈e.
FIG. 36 a diagram illustrating a variation with a=b=d.

FIG. 37 is a diagram illustrating a variation where the both end portions of the tape in the widthwise direction are cut and removed to align the width dimension.

FIG. 38 is another diagram illustrating a variation where the both end portions of the tape in the widthwise direction are cut/removed to align the widthwise direction.

FIG. 39 is a sectional diagram illustrating a state before cutting in a variation for producing a die-cut label and a state where the label is separated after the cutting.

FIG. 40 is a sectional diagram illustrating a state after cutting of the variation where the die-cut label is produced.

DETAILED DESCRIPTION OF THE PREFERRED EMBODIMENTS

Embodiment of the present invention will be described below referring to the attached drawings.

A first embodiment of the present invention will be described referring to FIGS. 1 to 17. This embodiment shows the case where the present invention is applied to a RFID label producing system. FIG. 1 is a system configuration diagram illustrating a RFID tag manufacturing system to which an apparatus for communicating with a RFID tag provided with a cartridge for including at least a RFID tag including a roll of tape with RFID tag of this embodiment is applied.

In a RFID tag manufacturing system 1 shown in FIG. 1, an apparatus 2 for communicating with a RFID tag is connected to a route server 4, a terminal 5, a general purpose computer 6, and a plurality of information servers 7 through a wired or wireless communication line 3.

FIG. 2 is a conceptual block diagram illustrating a detailed structure of the apparatus 2 for communicating with a RFID tag. In FIG. 2, a cartridge holder portion (not shown) as a recess place is provided at a main body 8 of the apparatus 2 for communicating with a RFID tag, and a cartridge (cartridge for including at least a RFID tag) 100 is detachably attached to this holder part.

The main body 8 includes a housing 9 provided with the cartridge holder portion to which the cartridge 100 is fitted and constituting an outer profile, a print head (thermal head) 10 configured to carry out predetermined print (printing) on a cover film (print-receiving tape) 103, a driving shaft 11 configured to drive an ink ribbon 105 which has finished print to the cover film 103, a tape-feed-roller drive shaft 12 configured to bond the cover film (print-receiving tape) 103 to a strip-shaped base tape (tag tape) 301 and feeding it out of the cartridge 100 as a tag label tape 110 with print at the same time, an antenna 14 configured to transmit and receive a signal by wireless communication using a high frequency band such as an UHF band with a RFID circuit element To (whose detail will be described later) provided at the tag label tape 110 with print, a cutter 15 configured to cut the tag label tape 110 with print to a predetermined length at a predetermined timing configured to produce a label-shaped RFID label T (whose detail will be described later), a pair of feeding guides 13 configured to set/hold the RFID circuit element To a predetermined access area opposed to the antenna 14 at transmission/receiving of the signal by the wireless communication and configured to guide each RFID label T after being cut, a feeding roller 17 configured to convey and feed the guided RFID label T to a carry-out exit 16, and a tape end sensor 18 configured to detect presence of the RFID label T at the carry-out exit 16.

The tape end sensor 18 is a reflective photoelectric sensor made of a projector and a receiver, for example. If there is no RFID label T between the projector and the receiver, light output from the projector is not input to the receiver. On the other hand, if the RFID label T exists between the projector and the receiver, the light output from the projector is reflected and enters the receiver so that a control output from the receiver is reversed.

On the other hand, the main body 8 further includes a radio frequency circuit 21 configured to access (read or write) the RFID circuit element To through the antenna 14, a signal processing circuit 22 configured to process a signal read from the RFID circuit element To, a motor to drive cartridge shaft 23 configured to drive the driving shaft 11 and the tape-feed-roller drive shaft 12 described above, a cartridge shaft drive circuit 24 configured to control the drive of the motor to drive cartridge shaft 23, a print-head drive circuit 25 configured to control the power supplied to the print head 10, a solenoid 26 configured to drive the cutter 15 to cause it to carry out cutting operation, a solenoid drive circuit 27 configured to control the solenoid 26, a tape-feeding roller motor 28 configured to drive the feed rollers 17, a feeding roller drive circuit 29 configured to control the tape-feeding roller motor 28, and a control circuit 30 configured to control the apparatus 2 for communicating with a RFID tag in its entirety through the radio frequency circuit 21, the signal processing circuit 22, the cartridge shaft drive circuit 24, the print-head drive circuit 25, the solenoid drive circuit 27, the tape-feeding roller drive circuit 29 and the like.

Although not illustrated in detail, the control circuit 30 is a so-called micro computer that is composed of a CPU as a central processing unit, a ROM, a RAM, and the like, and carries out signal processing according to a program previously stored in the ROM while making use of a temporary storing function of the RAM. Further, the control circuit 30 is connected to, for example, a communication line 3 though an input/output interface 31 so that it can transmit and receive information to and from the route server 4, the terminal 5, the general purpose computer 6, the information servers 7, and the like connected to the communication line 3.

FIG. 3 is an explanatory diagram for illustrating a detailed structure of the cartridge 100 provided with the roll of tape with RFID tag according to this embodiment provided at the apparatus 2 for communicating with a RFID tag.

In FIG. 3, the cartridge 100 includes a first roll (roll of tape with RFID tag according to this embodiment) 102 having the base tape 301 wound therearound, a second roll (print-receiving tape roll) 104 having the transparent cover film 103 approximately as wide as the base tape 301 wound therearound, a ribbon-supply-side roll 111 configured to feed out the ink ribbon 105 (thermal transfer ribbon, however, the cover film 103 may be configured by a thermal tape, and in that case, this is not needed), the ribbon take-up roller 106 configured to take up the ink ribbon 105 after print, a pressure roller 107 configured to press the base tape 301 against the cover film 103 and bonding them to each other so as to arrange them as the tag label tape 110 with print while feeding the tape in the direction shown by an arrow A.

The first roll 102 winds the base tape 301, on which a plurality of the RFID circuit elements To are sequentially formed in a lengthwise direction at predetermined intervals, around a reel member 102a.

In the example, the base tape 301 has a four-layer structure (refer to a partially enlarged view of FIG. 3) and is arranged by laminating an adhesive layer (adhesive layer for bonding) 301a composed of an appropriate adhesive material, a colored base film 301b composed of PET (polyethylene terephthalate) and the like, an adhesive layer (adhesive layer for affixing) 301c composed of an appropriate adhesive material, and a separation sheet (separation layer) 301d, and the like in this order from a side thereof wound inward (on a right side in FIG. 3) to an opposite side (on a left side in FIG. 3).

On the back side of the base film 301b (left side in FIG. 3), an IC circuit part 151 configured to store information is provided integrally, an antenna (tag antenna) 152 configured to transmit and receiving information, connected to the IC circuit part 151, is formed on the back side of the base film 301b (by means of printing in this example), and the RFID circuit element To is disposed by the IC circuit part 151 and the antenna 152.

On the front side of the base film 301b (right side in FIG. 3), the adhesive layer 301a is formed to bond the cover film 103 later, and further the separation sheet 301d is bonded to the base film 301b by the adhesive layer 301c disposed to include the RFID circuit element To on the back side of the base film 301b (on the left side of FIG. 3). Note that, when the RFID label T is finally finished to a label shape and bonded to a predetermined commodity and the like, it can be bonded thereto through the adhesive layer 301c exposed by separating the separation sheet 301d. Also, the adhesive layer 301c is disposed on the entire surface of the back side of the base film 301b so as to include the RFID circuit element To, but not limited to this, it may be disposed at a portion other than a place where the RFID circuit element To is mounted on the back side of the base film 301b (in this case, bonding with the separation sheet 301d is not carried out at the place where the RFID circuit element To is mounted but bonding to the separation sheet 301d is carried out by the adhesive layer 301c disposed other than that).

The second roll 104 winds the cover film 103 around a reel member 104a. With regard to the cover film 103, the ink ribbon 105 driven by the ribbon-supply-side roll 111 and the ribbon take-up roller 106 disposed on its back surface side (that is, on the side bonded to the base tape 301) is pressed against the print head 10 and brought into contact with the back surface of the cover film 103.

The ribbon take-up roller 106 and the pressure roller 107 are driven in rotation by transmitting the drive force of the motor to drive cartridge shaft 23 (refer to FIG. 2 described above), which is, for example, a pulse motor disposed to the outside of the cartridge 100 to the driving shaft 11 and the tape-feed-roller drive shaft 12.

In the cartridge 100 arranged as above, the base tape 301 fed out from the first roll 102 is supplied to the pressure roller 107. On the other hand, the ink ribbon 105 is brought into contact with the cover film 103 fed out from the second roll 104 on its back surface as mentioned above.

Then, when the cartridge 100 is mounted in the cartridge holder portion of the main body 8 and a roll holder (not shown) is moved from a separate position to an abutment position, the cover film 103 and the ink ribbon 105 are clamped between the print head 10 and a platen roller 108 as well as the base tape 301 and the cover film 103 are clamped between the pressure roller 107 and a sub-roller 109. Then, the ribbon take-up roller 106 and the pressure roller 107 are driven in rotation in synchronism, respectively by the drive force of the motor to drive cartridge shaft 23 in the directions shown by arrows B and C. At the time, the tape-feed-roller drive shaft 12, the sub-roller 109 and the platen roller 108 described above are coupled with each other by gears (not shown). Thus, the pressure roller 107, the sub-roller 109, and the platen roller 108 are rotated by driving the tape-feed-roller drive shaft 12, thereby the four-layered structure base tape 301 is fed out from the first roll 102 and supplied to the pressure roller 107 as described above. On the other hand, the cover film 103 is fed out from the second roll 104 as well as a plurality of heating elements of the print head 10 are energized by the print-head drive circuit 25. As a result, a print R (refer to FIG. 7 to be described below) such as predetermined characters, symbols, barcodes and the like is printed on the back surface of the cover film 103 (=the face on the side of the adhesive layer 301a) (however, characters in mirror-image printing when seen from the printed side since print is made from the back surface). Then, the four-layered structure base tape 301 is bonded to and integrated with the cover film 103 having been subjected to the print by the pressure roller 107 and sub-roller 109. As a result, the tag label tape with print 100 is formed and is transported to the outside of the cartridge 100. Note that the ink ribbon 105, which has been finished print to the cover film 103, is taken up to the ribbon take-up roller 106 by driving the driving shaft 11.

FIG. 4 is a functional block diagram illustrating a detailed function of the radio frequency circuit 21. In FIG. 4, the radio frequency circuit 21 includes a transmitting portion 32 configured to transmit a signal to the RFID circuit element To through the antenna 14, a receiving portion 33 configured to receive an reflective wave from the RFID circuit element To received by the antenna 14, and a transmit-receive splitter 34.

The transmitting portion 32 includes a crystal oscillator 35 configured to generate a carrier wave for accessing (reading or writing) the RFID tag information of the IC circuit part 151 of the RFID circuit element To, a PLL (phase Locked Loop) 36, a VCO (Voltage Controlled Oscillator) 37, a transmission multiplying circuit 38 configured to modulate (in this example, amplitude modulation based on a "TX_ASK" signal from the signal processing circuit 22) the generated carrier wave based on a signal supplied from the signal processing circuit 22 (however, in the case of amplitude modulation, a variable amplification factor amplifier or the like may be used), and a transmission amplifier 39 configured to amplify the modulated wave modulated by the transmission multiplying circuit 38. The generated carrier wave preferably uses a frequency in the UHF band, and the output of the transmission amplifier 39 is transmitted to the antenna 14 through the transmit-receive splitter 34 and supplied to the IC circuit part 151 of the RFID circuit element To.

The receiving portion 33 includes a first reception multiplying circuit 40 configured to multiply a reflective wave from the RFID circuit element To received by the antenna 14 by the generated carrier wave, a first band-pass filter 41 configured to extract only a signal of necessary band from the output of the first reception multiplying circuit 40, a first receiving amplifier 43 configured to amplify the output of this first band-pass filter 41 and supplying it to a first limiter 42, a second reception multiplying circuit 44 configured to multiply the reflective wave from the RFID circuit element To received by the antenna 14 by the carrier wave whose phase is delayed by 90° after being generated, a second band-pass filter 45 configured to extract a signal of necessary band from the output of the second reception multiplying circuit 44, and a second receiving amplifier 47 configured to receive and amplifying the output of the second band-pass filter 45 and supplying it to a second limiter 46. Asignal "RXS-I" output from the first limiter 42 and a signal "RXS-Q" output from the second limiter 46 are input to and processed by the signal processing circuit 22.

Further, the outputs from the first receiving amplifier 43 and the second receiving amplifier 47 are input to an RSSI (Received Signal Strength Indicator) circuit 48, and signals "RSSI" indicating the intensities of those signals are input to the signal processing circuit 22. In this way, in the apparatus 2 for communicating with a RFID tag according to this embodiment, the reflective wave from the RFID circuit element To is demodulated by I-Q orthogonal demodulation.

FIG. 5 is a functional block diagram illustrating a functional arrangement of the RFID circuit element To provided at the tag tape with print 110.

In FIG. 5, the RFID circuit element To includes the antenna (tag antenna) 152 configured to transmit and receive a signal in a non-contact manner using the radio frequency such as the UHF band to and from the antenna 14 and the IC circuit part 151 connected to the antenna 152.

The IC circuit part 151 includes a rectification part 153 configured to rectify the carrier wave received by the antenna 152, a power source part 154 configured to accumulate energy of the carrier wave rectified by the rectification part 153 to use it as a driving power source, a clock extraction part 156 configured to extract a clock signal from the carrier wave received by the antenna 152 and supplying it to a control unit 155, a memory part 157 functioning as an information storage device which can store a predetermined information signal, a modem part 158 connected to the antenna 152, and the control unit 155 configured to control actuation of the RFID circuit element To through the rectification part 153, the clock extraction part 156, the modem part 158 and the like.

The modem part 158 demodulates a radio communication signal from the antenna 14 of the apparatus 2 for communicating with a RFID tag, received by the antenna 152 and modulates and reflects the carrier wave received by the antenna 152 based on a response signal from the control unit 155.

The control unit 155 carries out a basic control such as interpretation of a received signal demodulated by the modem part 158, generation of a return signal based on the information signal stored in the memory part 157, and return of the return signal by the modem part 158, and the like.

FIG. 6 is a view illustrating an example of a screen displayed on the terminal 5 or general purpose computer 6 at an access (writing in this example) to the RFID tag information of the IC circuit part 151 of the RFID circuit element To by the apparatus 2 for communicating with a RFID tag as mentioned above.

In FIG. 6, in this example, the type of the tag label (access frequency and tape dimension), the print R printed in correspondence with the RFID circuit element To, an access (reading in this example) ID, which is an ID specific to the RFID circuit element To, an address of the commodity information stored in the information server 7, and an address of a storage destination of the corresponding information in the route server 4 can be displayed on the terminal 5 or the general purpose computer 6. And the apparatus 2 for communicating with a RFID tag is operated by operation of the terminal 5 or the general purpose computer 6, the print characters R is printed on the cover film 103 and the RFID tag information such as the corresponding commodity information is written in the IC circuit part 151.

In the above basic arrangement, the most distinctive characteristic of this embodiment is that the dimension in the widthwise direction of the separation sheet 301d constituting the base tape 301 is made larger than those in the widthwise direction of the adhesive layer 301a, the base film 301b and the adhesive layer 301c. The details will be described below.

FIGS. 7A and 7B are views illustrating an example of an appearance of the RFID label T formed by completing information reading (or writing) of the RFID circuit element To and cutting of the tag label tape 110 with print as mentioned above, in which FIG. 7A is a top view and FIG. 7B is a bottom view. Also, FIG. 8 is a lateral sectional view taken along the line VIII-VIII' in FIG. 7.

In FIGS. 7A, 7B and 8, the RFID label T is in a five-layered structure in which the cover film 103 is added to the four-layered structure shown in FIG. 3, and the five layers are composed of the cover film 103, the adhesive layer 301a, the base film 301b, the adhesive layer 301c, and the separation sheet 301d from the side of cover film 103 (upper side in FIG. 8) to the opposite side thereof (lower side in FIG. 8). As described above, the RFID circuit element To including the antenna 152 disposed to the back side of the base film 301b is provided in the adhesive layer 301c, as well as a print R (letters "RF-ID" indicating the type of the RFID label T in this example) is printed on the back surface of the cover film 103.

At this time, in this embodiment, as shown in FIG. 8, the base tape 301 is composed by bonding the separation sheet 301d to the adhesive layer 301c formed, the width of the separation sheet 301d being larger than those of the adhesive layer 301a, the base film 301b, and the adhesive layer 301c having approximately the same widths. To the adhesive layer 301a of the base tape 301 thus composed, the cover film 103 is bonded to form the tag label tape 110 with print, the width of the cover film 103 being formed approximately as same as the adhesive layer 301a, the base film 301b and the adhesive layer 301c.

In this embodiment arranged as above, to the RFID circuit element To taken out from the cartridge 100 of the apparatus 2 for communicating with a RFID tag as the tag label tape 110 with print and set and held at a predetermined position (access area) opposed to the antenna 14 by the feeding guide 13, an access is made sequentially (reading of the RFID tag information by the IC circuit part 151 or writing to the IC circuit part 151), and the tape is cut for each of the RFID circuit element To by the cutter 15 so as to create the RFID label T. After the separation sheet 301d is peeled off by a user and the adhesive layer 301c is exposed, the created RFID label T is affixed to various target commodities through the adhesive layer 301c for use.

An effect which can be obtained by the above-mentioned embodiment will be described in detail using a comparative example.

FIG. 9 is a conceptual side view illustrating a detailed structure of the first roll 102, and FIG. 10 is a lateral sectional view taken along the line X-XI in FIG. 9 illustrating a laminated structure of two base tapes 301 adjacent to each other in the radial direction of the first roll 102.

As shown in FIGS. 9 and 10, when the first roll (roll of tape with RFID tag) 102 is formed by winding the base tape 301 having the laminated structure composed of the adhesive layer 301a, the base film 301b, the adhesive layer 301c, and the separation sheet 301d, the laminated structure is overlapped and wound in the radial direction of the roll, and the separation sheet 301d is interposed between the adhesive layer 301c included in the base layer outside in the radial direction (upper side in FIG. 10) and the adhesive layer 301a included in the base layer and adjacent to the adhesive layer 301c inside in the radial direction (lower side in FIG. 10) as shown in FIG. 10.

Here, manufacture of the roll of tape with RFID tag 102 is usually made by covering the adhesive layer 301c of the base tape body (=adhesive layer 301a+base film 301b+adhesive layer 301c) created with a predetermined width in advance by the separation sheet 301d while interposing the RFID circuit element To therebetween and winding them as a pair severalfold in the radial direction from the view of eliminating a waste of the RFID circuit element To and preventing cost increase. However, in this case, when the adhesive layer 301c is covered by the separation sheet 301d, even if they are positioned so that the center positions of the both in the widthwise direction coincide with each other, there is a possibility that the center positions are displaced to some degree due to an accuracy of the device for doing that work.

At this time, as a comparative example, suppose the case that a roll of tape with RFID tag is formed by winding a base tape (tag tape) 301' composed by combining the base tape body (adhesive layer 301a+base film 301b+adhesive layer 301c) and a separation sheet (separation layer) 301d' with approximately the same width as the base tape body. FIG. 11 is a lateral sectional view illustrating the laminated structure of the two base tapes 301' adjacent to each other in the radial direction when the base tape 301' is wound in this comparative example, which corresponds to FIG. 10. The same reference numerals are given to the equivalent portions in FIG. 10 and the description will be omitted as appropriate.

As shown in FIG. 11, the base tape 301' of this comparative example is provided with the laminated structure composed of the adhesive layer 301a, the base film 301b, the adhesive layer 301c, and the separation sheet 301d', each of which being formed with approximately the same width.

In the comparative example arranged in this way, if the center positions are displaced due to the above accuracy reason (center position displacement between the adhesive layer 301c and the separation sheet 301d') (the displaced state is shown by a dashed line in FIG. 11), a part 301c1 of the adhesive layer 301c, which should have been covered by the separation sheet 301d' is not covered by the separation sheet 301d' any more, and as a result, the adhesive layer 301c (part 301c1) included in the layer of base tape 301' outside in the radial direction (upper side in FIG. 11) and the adhesive layer 301a included in the layer of the base tape 301' and adjacent to the adhesive layer 301c inside in the radial direction (lower side in FIG. 11) might adhere to each other (=causes wrong adhesion between the adhesives).

Also, in FIG. 11, each layer of the base tape 301' is shown with approximately the same thickness, but since the adhesive layer 301c is generally formed relatively thick for insertion disposal of the RFID circuit element To, the adhesive of the thick adhesive layer 301c in a large quantity might somewhat protrude outward from the end portion in the widthwise direction of the tape when the separation sheet 301d' is bonded to the adhesive layer 301c (this protruding state is shown by a broken line in FIG. 11). If the center positions are displaced between the adhesive layer 301c and the separation sheet 301d' in the state where the adhesive protrudes outward in the widthwise direction from the tape as above, there is a further possibility that the wrong adhesion is caused.

Moreover, if the adhesive protrudes from the end portion in the tape widthwise direction in this way, there is a possibility that a protruding portion 301c2 is brought into contact with the side wall surface of the first roll 102 disposal portion in the cartridge 100 and sticks thereto (=wrong adhesion to the side wall). In the case of these phenomena, the base tape 301' can not be easily fed out from the first roll 102.

In contrast, in this embodiment, since the width of the separation sheet 301d is formed larger than those of the adhesive layer 301a, the base film 301b, and the adhesive layer 301c as shown in FIG. 10, even if the center positions in the widthwise direction of the adhesive layer 301c and the separation sheet 301d are somewhat displaced and laminated at manufacture as described above (the displaced state is shown by the dashed line in FIG. 10), the end portion in the widthwise direction of the separation sheet 301d can be surely interposed between the adhesive layers (that is, the adhesive layer 301c and the adhesive layer 301a) of the base layers adjacent in the radial direction. By this, adhesion between the adhesive layer 301c and the adhesive layer 301a (=causing wrong adhesion between the adhesives) can be prevented.

Also, even if the center positions are displaced between the adhesive layer 301c and the separation sheet 301d in the state where the adhesive of the relatively thick adhesive layer 301c in a large quantity for disposal of the RFID circuit element To somewhat protrudes from the end portion in the widthwise direction of the tape (this protruding state is shown by the broken line in FIG. 10), by forming the width of the separation sheet 301d large, taking the protruding amount into account, a widthwise direction end portion 301d1 of the separation sheet 301d is surely interposed between the protruding portion 301c2 of the adhesive layer 301c and the adhesive layer 301a to enable prevention of the wrong adhesion.

Moreover, since the width of the adhesive layer 301c is smaller than that of the separation sheet 301d, the wrong adhesion of the protruding portion 301c2 to the side wall of the first roll 102 disposal portion in the cartridge 100 can be also prevented.

As a result, feeding-out performance of the base tape 301 from the first roll 102 can be maintained favorable.

Note that in the first embodiment of the present invention, various variations are possible in a range not departing from its gist and technical idea. The variations will be described below.

(1-1) When an Adhesive Layer is Disposed Between the Base Film and the RFID Circuit Element:

FIG. 12 is a lateral sectional view illustrating the laminated structure of two base tapes 301A adjacent to each other in the radial direction when the base tape (tag tape) 301A of this variation is wound, which corresponds to FIG. 10 of the above embodiment. The same reference numerals are given to the equivalent portions in FIG. 10 and the description will be omitted as appropriate.

In FIG. 12, a difference between the base tape 301A of this variation and the base tape 301 in the above embodiment is that in the base tape 301, the IC circuit part 151 of the RFID circuit element To is integrally provided on the back side of the base film 301b and the antenna 152 is formed by print or the like on its front surface, while in the base tape 301A of this variation, an adhesive layer (adhesive layer for mounting) 301e configured to mount the RFID circuit element To is disposed on the back side of the base film 301b (lower side in FIG. 12) and the RFID circuit element To is bonded to the base film 301b by this adhesive layer 301e.

The adhesive layer 301e is disposed approximately on the entire surface of the back side of the base film 301b configured to bond the RFID circuit element To on the back side of the base film 301b, and its width is formed approximately equal to those of the adhesive layer 301a, the base film 301b, and the adhesive layer 301c. Further, the adhesive layer 301c is disposed for bonding the separation sheet 301d to the adhesive layer 301e so as to hold the RFID circuit element To therebetween. As a result, the RFID circuit element To is included in the adhesive layer 301e and the adhesive layer 301c. Incidentally, the adhesive layer 301e and the adhesive layer 301c are firmly bonded, and the adhesive layer 301e and the adhesive layer 301c are brought in approximately the integrally adherent state at the manufacture of the base tape 301A. When the RFID label T finally completed in the label shape is to be affixed to a predetermined commodity or the like as mentioned above, the separation sheet 301d is peeled off the base tape body side (adhesive layer 301c) so that the RFID label T is affixed to the commodity or the like by the adhesive layer 301c.

The separation sheet 301d is formed such that its width is larger than those of the adhesive layer 301a, the base film 301b, the adhesive layer 301e, and the adhesive layer 301c as in the above embodiment.

In this variation, too, even if the adhesive layer 301c and the separation sheet 301d are laminated with the widthwise direction center positions of the both somewhat displaced at the manufacture of the base tape 301A (this displaced state is shown by the dashed line in FIG. 12), since the end portion in the widthwise direction of the separation sheet 301d can be surely interposed between the adhesive layers in the layers of the base tapes 301A adjacent to each other in the radial direction in overlapping winding (that is, between the adhesive layer 301c and the adhesive layer 301a), the wrong adhesion between the adhesive layers can be prevented.

Also, as mentioned above, there is a possibility that the adhesive layer 301c might protrude from the end portion in the widthwise direction of the tape to some degree, but since the adhesive layer 301e in this variation is also formed relatively thick for bonding of the RFID circuit element To, the adhesive might somewhat protrude from the end portion in the widthwise direction of the tape (the protruding state of these adhesive layers 301c and 301e are shown by the broken line in FIG. 12). According to the variation, even if the position displacement occurs in the protruding state, the widthwise direction end portion 301d1 of the separation sheet 301d can be surely interposed therebetween to enable prevention of the wrong adhesion.

Moreover, since the widths of the adhesive layers 301c and 301e are smaller than that of the separation sheet 301d, the wrong adhesion of the above protruding portions 301c2 and 301e2 to the side wall of the first roll 102 disposal portion in the cartridge 100 can be prevented.

As a result, the same effect as that of the above embodiment can be obtained that the feeling-out performance of the base tape 301A from the first roll (roll of tape with RFID tag) 102A can be maintained favorable.

In the above variation, the adhesive layer 301e is disposed over approximately the entire surface on the back side of the base film 301b, but not limited to this, it may be disposed only at the bonded portion with the RFID circuit element To on the back side of the base film 301b. Also, in the above variation, the adhesive layer 301e and the adhesive layer 301c are formed separately, but the base tape may be formed of the adhesive layers 301e and 301c as a single adhesive layer.

(1-2) When Bonding is not Carried Out:

That is, not that the print is carried out on the cover film 103 different from the base tape 301 provided with the RFID circuit element To bond them together as in the above embodiment, but this is the case that the present invention is applied to the cartridge for including at least a RFID tag for carrying out print on the base film provided at the thermal tape.

FIG. 13 is an explanatory diagram for illustrating a detailed structure of a cartridge 100' of this variation, which corresponds to the above FIG. 3. The equivalent portions to FIG. 3 are given the same reference numerals and the description will be omitted as appropriate.

In FIG. 13, the cartridge 100I includes a first roll (roll of tape with RFID tag) 102B wound with a thermal tape (tag tape) 301B, a tape feed roller 107' configured to feed the thermal tape 301B in a direction outside the cartridge 100', and a guide roller 120 configured to feed the thermal tape 301B while changing the transport direction thereof.

The first roll 102B is wound with the strip-shaped thermal tape 301B (colored in a predetermined color so that the RFID circuit element To is not visible from the print side, for example) in which a plurality of the RFID circuit elements To are sequentially formed in the lengthwise direction around a reel member 102Ba.

The thermal tape 301B wound around the first roll 102B is in a three-layered structure in this example (See a partially enlarged view in FIG. 13) and is formed in lamination in the order of a base film (base layer) 301Ba made of polyethylene terephthalate (PET) and the like, an adhesive layer (adhesive layer for affixing) 301Bb made of an appropriate adhesive, and a separation sheet (separation layer) 301Bc from the side wound outside (right side in FIG. 13) toward the opposite side (left side in FIG. 13). A thermal agent producing color by a heat is applied on the front side surface of the base film 301Ba.

On the back side of the base film 301Ba, the IC circuit part 151 configured to store information is provided integrally, and the antenna 152 is formed on the surface of the back side of the base film 301Ba (by printing or the like in this example). To the back side of the base film 301Ba, the separation sheet 301Bc is bonded by the adhesive layer 301Bb. Incidentally, when the RFID label T finally completed in the label shape is to be affixed to a predetermined commodity or the like, the separation sheet 301Bc enables the label to be affixed to the commodity or the like through the adhesive layer 301Bb by being peeled off.

When the cartridge 100' is mounted to the cartridge holder portion of the apparatus 2 for communicating with a RFID tag and a roller holder (not shown) is moved from a separated position to a contact position, the thermal tape 301B is held between the print head 10 and the platen roller 108 and between the tape feed roller 107' and the sub roller 109. And the tape feed roller 107', the sub roller 109, and the platen roller 108 are rotated in synchronization with each other accompanied by driving of the tape-feed-roller drive shaft 12 with a driving force of the motor to drive cartridge shaft 23 (See FIG. 2), and the thermal tape 301B is fed out from the first roll 102B, redirected by the guide roller 120, and then supplied to the side of print head 10.

A plurality of heating elements of the print head 10 is supplied with a power through the print-head drive circuit 25 (See FIG. 2), by which the print is printed on the surface of the base film 301Ba of the thermal tape 301B, and the thermal tape is formed as a tag label tape 110 with print' and then fed out from the cartridge 100'. Incidentally, it is needless to say that print may be made using the ink ribbon as in the above embodiment.

Since the access (information reading/writing) to the RFID tag information through the antenna 14, feeding by the feeding roller 17, cutting by the cutter 15, and the like after feeding-out of the cartridge 100' are the same as those in the above embodiment, the description will be omitted.

FIG. 14 is a conceptual side view illustrating a detailed structure of the first roll 102B, and FIG. 15 is a lateral sectional view taken along the line XV-XV' in FIG. 14 illustrating the laminated structure of the two thermal tapes 301B adjacent to each other in the radial direction of the first roll 102B. As shown in FIG. 15, the separation sheet 301Bc of the thermal tape 301B is formed to have the width larger than those of the base film 301Ba and the adhesive layer 301Bb.

In this variation arranged as above, approximately the same effect as that of the above embodiment can be also obtained. This will be described below in detail using a comparative example.

As shown in FIGS. 14 and 15, when the first roll (roll of tape with RFID tag) 102B is formed by winding therearound the thermal tape 301B provided with the laminated structure composed of the base film 301Ba, the adhesive layer 301Bb, and the separation sheet 301Bc, the laminated structure is overlapped and wound in the radial direction of the roll, and the separation sheet 301Bc and the base film 301Ba are interposed between the adhesive layer 301Bb included in the thermal tape layer outside in the radial direction (upper side in FIG. 15) and the adhesive layer 301Bb included in the thermal tape layer adjacent thereto inside the radial direction (lower side in FIG. 15) as shown in FIG. 15.

Here, as described above, since the adhesive layer 301Bb is generally formed relatively thick for insertion disposal of the RFID circuit element To, there is a possibility that when the separation sheet 301Bc is bonded to the adhesive layer 301Bb at the manufacture of the thermal tape 301B, the adhesive of the thick adhesive layer 301Bb in a large quantity somewhat protrudes from the end portion in the widthwise direction of the tape (this protruding state is shown by a broken line in FIG. 15).

At this time, suppose the case that a thermal tape is formed by winding a thermal tape 301B' including a separation sheet (separation layer) 301Bc' with approximately the same width as those of the base film 301Ba and the adhesive layer 301Bb as a comparative example. FIG. 16 is a lateral sectional view illustrating the laminated structure of the two thermal tapes 301B' adjacent to each other in the radial direction when the thermal tape 301B' is wound in this comparative example and corresponds to FIG. 15. The same reference numerals are given to the equivalent portions in FIG. 15 and the description will be omitted as appropriate.

As shown in FIG. 16, the thermal tape 301B' of this comparative example is provided with the laminated structure composed of the base film 301Ba, the adhesive layer 301Bb, and the separation sheet 301Bc', each of which formed with approximately the same width.

In this comparative example arranged as above, since there is nothing to be interposed between the protruding portion 301Bb1 of the adhesive layer 301Bb included in the thermal tape 301B layer outside in the radial direction (upper side in FIG. 16) and the protruding portion 301Bb1 of the adhesive layer 301Bb included in the thermal tape 301B layer adjacent thereto inside the radial direction (lower side in FIG. 16) at the manufacture of the thermal tape roll, there is a possibility that the protruding portions 301Bb1 and 303Bb1 stick to each other as shown by an arrow D in FIG. 16 (=wrong adhesion between the adhesives).

Particularly, if the center positions are displaced between the adhesive layer 301Bb and the separation sheet 301Bc' (center position displacement due to the reason of accuracy as mentioned above. This displaced state is shown by a dashed line in FIG. 16) at the manufacture of the thermal tape 301B' as mentioned above, a part 301Bb2 of the adhesive layer 301Bb which should have been covered by the separation sheet 301Bc' is exposed. As a result, there is a further possibility that the wrong adhesion occurs between the protruding portions 301Bb1 and 301Bb1.

In contrast, in this embodiment, since the width of the separation sheet 301Bc is formed larger than those of the base film 301Ba and the adhesive layer 301Bb as shown in FIG. 15, the end portion in the widthwise direction of the separation sheet 301Bc can be surely interposed between the protruding portions 301Bb1 of the adhesive of the thermal tape layers adjacent to each other in the radial direction to enable prevention of the wrong adhesion.

Also, even if the above center position displacement occurs in the widthwise direction between the adhesive layer 301Bb and the separation sheet 301Bc at the manufacture (this displaced state is shown by the dashed line in FIG. 15), the widthwise direction end portion 301Bc1 of the separation sheet 301Bc can be surely interposed between the protruding portions 301Bb1 to enable prevention of the wrong adhesion.

Moreover, since the width of the adhesive layer 301Bb is made smaller than that of the separation sheet 301Bc, the wrong adhesion of the protruding portion 301Bb1 to the side wall of the first roll 102B arrangement portion in the cartridge 100' can be also prevented.

As a result, the feeding-out performance of the thermal tape 301B from the first roll 102B can be maintained favorable.

In the above variation, print is carried out by bringing the print head 10 into contact with the base film 301Ba from outside the cartridge 100', but not limited thereto, the print may be carried out from inside of the cartridge 100' as in the above embodiment.

It should be noted that it is needless to say that the arrangements of the first embodiment and the variations of (1-1) and (1-2) may be partially combined as appropriate, and the similar effects can be also obtained in these cases. For example, when an adhesive layer for mounting is disposed between the base film 301Ba and the RFID circuit element To as the above (1-1) in the thermal tape 301B of the above (1-2), the similar effect can be also obtained.

Also, in the above, a difference between the width of the separation sheet 301d and the like and that of the adhesive layer 301c and the like (protruding amount) is not particularly specified, but the difference may be determined on the basis of the following equation:

$$d \geq t$$

where, "d" is a protruding amount of the separation sheet 301d protruding from the adhesive layer 301c, and "t" is a thickness of a portion of the base tape 301 other than the separation sheet 301d (See FIG. 17). Since the end portion of the adhesive material layer is located outside from the end portion of the adhesive layer in the thickness dimension of the adhesive layer, even if the end portion of the adhesive layer is deformed due to pressure by winding or the like, protrusion of the adhesive from the separation layer can be prevented. By this, the dimension in the widthwise direction of the separation sheet 301d protruding from the portion other than that can be sufficiently ensured, by which an effect can be surely obtained in preventing the wrong adhesion.

A second embodiment of the present invention will be described below referring to the attached drawings. The same reference numerals are used for the equivalent portions as in the first embodiment, and the description will be omitted or simplified as appropriate.

FIG. 18 is a conceptual block diagram illustrating a detailed structure of a apparatus 2 for communicating with a RFID tag provided with a roll of tape with RFID tag of this embodiment, FIG. 19 is an explanatory diagram for illustrating a detailed structure of a cartridge 100 provided with the roll of tape with RFID tag according to this embodiment provided at the apparatus 2 for communicating with a RFID tag, and they correspond to FIGS. 2 and 3 in the first embodiment, respectively.

In FIGS. 18 and 19, in this embodiment, a tag tape 401 is wound around the first roll (roll of tape with RFID tag in this embodiment) 102 instead of the base tape 301 in the above embodiment, and the transparent cover film 103 with approximately the same width as that of the tag tape 401 is wound around a second roll (print-receiving tape roll) 104. A tape-feed-roller drive shaft 12 bonds the cover film (print-receiving tape) 103 and the strip-shaped tag tape 401 together and feeds out the bonded tape from the cartridge 100 as a tag label tape 110 with print.

The first roll 102 is wound with the tag tape 401 on which a plurality of RFID circuit elements To are sequentially formed with a predetermined equal interval continuously in the lengthwise direction around a reel member 102a. In this case, the tag tape is in a five-layered structure (See a partially enlarged view in FIG. 19) composed of an adhesive layer (adhesive layer for bonding) 401a made of an appropriate adhesive, a colored base film (base layer) 401b made of polyethylene terephthalate (PET) and the like, an adhesive layer (adhesive layer for mounting) 401e made of an appropriate adhesive having approximately the same color as that of the base film 401b, an adhesive layer (adhesive layer for affixing) 401c made of an appropriate adhesive and having approximately the same color as that of the base film 401b, and a separation sheet (separation layer) 401d in this order from the side wound inside (right side in FIG. 19) to the opposite side (left side in FIG. 19).

On the front side of the base film 401b (right side in FIG. 19), the adhesive layer 401a configured to bond the cover film 103 later is formed, while on the back side of the base film 401b (left side in FIG. 19), the adhesive layer 401e is formed. By this adhesive layer 401e, the RFID circuit element To composed of an IC circuit part 151 configured to store information and an antenna (tag antenna) 152 configured to transmit and receive information, connected to the IC circuit part 151, is bonded to the base film 401b.

Also, on the back side of the adhesive layer 401e (left side in FIG. 19), the adhesive layer 401c configured to affix the separation sheet 401d to the base film 401b is disposed so as to include the RFID circuit element To. The adhesive layer 401c and the adhesive layer 401e are firmly bonded, and the adhesive layers 401c and 401e are approximately integrally bonded at the manufacture of the tag tape 401. And when a RFID label T finally completed in the label shape is to be affixed to a predetermined commodity or the like, the separation sheet 401d is peeled off the tag tape body side (adhesive layer 401c) so that the RFID label T is affixed to the commodity or the like by the adhesive layer 401c.

Note that here, the adhesive layer 401c is disposed on the entire surface of the back side of the adhesive layer 401e so as to include the RFID circuit element To, but not limited thereto, it may be disposed at a portion other than the mounted spot of the RFID circuit element To on the back side of the adhesive layer 401e.

In the cartridge 100 arranged as above, as with the first embodiment, a print R such as predetermined characters, symbols, barcodes and the like is printed on the back surface of the cover film 103 (=a surface on the side of the adhesive layer 401a), and the tag tape 401 of the five-layered structure and the cover film 103 on which the printing has been finished are bonded and integrated by the pressure roller 107 and the sub roller 109 to be formed as the tag label tape 110 with print and fed out from the cartridge 100.

The arrangement not particularly described in the above is approximately the same as that of the first embodiment. The most distinctive characteristic of this embodiment is that the width of a separation tape 401B composed of the adhesive layer 401c of the tag tape 401 and the separation sheet 401d (See FIG. 20, which will be described later) is made larger than that of a base tape 401A composed of the adhesive layer 401a, the base film 401b, and the adhesive layer 401e of the tag tape 401 (See FIG. 20, which will be described later). The detail will be described below.

FIG. 20 is a lateral sectional view illustrating an example of an appearance of the RFID label T formed after information reading (or writing) of the RFID circuit element To and cutting of the tag label tape 110 with print have been finished as mentioned above.

In FIG. 20, the RFID label T is in a six-layered structure in which the cover film 103 is added to the five-layered structure shown in FIG. 19 and is composed of the cover film 103, the adhesive layer 401a, the base film 401b, the adhesive layer 401e, the adhesive layer 401c, and the separation sheet 401d from the side of cover film 103 (upper side in FIG. 20) to the opposite side (lower side in FIG. 20). As described above, the RFID circuit element To including the antenna 152 is included between the adhesive layer 401e and the adhesive layer 401c, and the print R is printed on the back surface of the cover film 103.

At this time, in this embodiment, as shown in FIG. 20, the width of the separation tape 401B (the adhesive layer 401c and the separation sheet 401d) is formed larger than that of the base tape 401A (the adhesive layer 401a, the base film 401b, and the adhesive layer 401e), and the base tape 401A and the separation tape 401B are bonded so as to form the tag tape 401. Then, to the adhesive layer 401a of the tag tape 401 formed as above, the cover film 103 formed with the width larger than that of the separation tape 401B is bonded so as to form the tag label tape 110 with print.

In this embodiment arranged as above, to the RFID circuit element To taken out from a cartridge 100 of the apparatus 2 for communicating with a RFID tag as the tag label tape 110 with print and set and held by a feeding guide 13 at a predetermined position (access area) opposed to the antenna 14, an access (reading/writing of the RFID tag information from/into the IC circuit part 151) is made sequentially. Then the tape is cut by the cutter 15 for each of the RFID circuit elements To so as to create the RFID label T. After the separation sheet 401d is peeled off by a user and the adhesive layer 401c is exposed, the created RFID label T is affixed to various target commodities through the adhesive layer 401c for use.

The effect obtained by this embodiment described above will be described below in detail using a comparative example.

FIG. 21 is a conceptual side view illustrating a detailed structure of the first roll 102, and FIG. 22 is a lateral sectional view taken along the line P-P' in FIG. 21 illustrating a laminated structure of the two tag tapes 401 adjacent to each other in the radial direction of the first roll 102.

As shown in FIGS. 21 and 22, when the first roll 102 is formed by winding the tag tape 401 having the laminated structure composed of the adhesive layer 401a, the base film 401b, the adhesive layer 401e, the adhesive layer 401c, and the separation sheet 401d, the laminated structure is overlapped and wound in the radial direction of the roll, and, as shown in FIG. 22, the separation tape 401B (the adhesive layer 401c and the separation sheet 401d) is interposed between the adhesive layer 401e included in the tag tape 401 layer outside in the radial direction (upper side in FIG. 22) and the adhesive layer 401a included in the adjacent tag tape 401 layer inside in the radial direction (lower side in FIG. 22).

Here, from the view of eliminating a waste of the RFID circuit element To and preventing cost increase, at the manufacture of the roll of tape with RFID tag 102, the separation tape 401B is usually affixed to the side of the adhesive layer 401e of the base tape 401A having the RFID circuit element To fixed on the base film 401b through the adhesive layer 401e and created with a predetermined width in advance, and they are wound as a pair severalfold in the radial direction (after the separation tape 401B is affixed to the base tape 401A once, the adhesive layer 401c on the side of the separation tape 401B is bonded to the adhesive layer 401e on the side of the base tape 401A, and only the separation sheet 401d can be separated as mentioned above). However, in this case, when the separation tape 401B is affixed to the base tape 401A, even if they are positioned so that the center positions of the both in the widthwise direction coincide with each other, there is a possibility that the center positions are displaced to some degree due to an accuracy of the device for doing that work.

At this time, suppose the case as a comparative example where a tag tape 401' formed by combining the base tape 401A with the separation tape 401B' with approximately the same width is wound so as to form a roll of tape with RFID tag. FIG. 23 is a lateral sectional view illustrating a laminated structure of the two tag tapes 401' adjacent to each other in the radial direction of the roll of tape with RFID tag in which the tag tape 401' is wound in this comparative example, which corresponds to FIG. 22. The equivalent portions in FIG. 22 are given the same reference numerals, and the description will be omitted as appropriate.

As shown in FIG. 23, the tag tape 4011 of this comparative example is provided with a laminated structure composed of the adhesive layer 401a, the base film 401b, the adhesive layer 401e, the adhesive layer 401c' and the separation sheet 401d', each of which being formed with approximately the same width.

In the comparative example arranged as above, at the manufacture of the roll of tape with RFID tag, if the center positions are displaced between the base tape 401A and the separation tape 401B' due to the above accuracy reason (this displaced state is shown by a dashed line in FIG. 23), a part 401e1 of the adhesive layer 401e on the side of the base tape 401A which should have been covered by the separation tape 401B' is exposed, and as a result, there is a possibility that the adhesive layer 401e (part 401e1) included in the tag tape 401' layer outside in the radial direction (upper side in FIG. 23) and the adhesive layer 401a included in the tag tape 401' layer adjacent thereto inside in the radial direction (lower side in FIG. 23) stick to each other (=causes wrong adhesion between the adhesives).

Also, each layer of the tag tape 401' is illustrated with approximately the same thickness in FIG. 23, but since the adhesive layer 401e is generally formed relatively thick for bonding of the RFID circuit element To, when the separation tape 401B' is affixed to the base tape 401A, the thick adhesive layer 401e in a large quantity might somewhat protrude outward from the end portion in the widthwise direction of the tape (this protruding state is shown by a broken line in FIG. 23). If center positions are displaced between the base tape 401A and the separation tape 401B' due to the above accuracy reason in the state where the adhesive protrudes outward in the widthwise direction from the tape in this way, there is a further possibility that the wrong adhesion occurs.

Moreover, if the adhesive protrudes from the end portion of the tape in the widthwise direction, a protruding portion 401e2 might be brought into contact with the side wall surface of the first roll 102 disposal portion and stick thereto (=wrong adhesion to the side wall) in the cartridge 100.

In the case of the above phenomenon, there is a possibility that the tag tape 401' can not be easily fed out from the first roll 102.

In contrast, in this embodiment, since the width of the separation tape 401B is formed larger than that of the base tape 401A as shown in FIG. 22, even if the base tape 401A and the separation tape 401B are laminated with the center positions in the widthwise direction somewhat displaced at the manufacture as mentioned above (this displaced state is shown by the dashed line in FIG. 22), the end portion in the widthwise direction of the separation tape 401B can be surely interposed between the adhesive layers of the tag tape layers adjacent to each other in the radial direction (that is, the adhesive layer 401*e* and the adhesive layer 401*a*). By this, sticking to each other of the adhesive layer 401*e* and the adhesive layer 401*a* (=causes wrong adhesion between the adhesives) can be prevented.

Also, as mentioned above, even if the center positions are displaced between the base tape 401A and the separation tape 401B in the state where the adhesive in the relatively thick adhesive layer 401*e* in a large quantity for bonding the RFID circuit element To somewhat protrudes from the end portion in the widthwise direction of the tape (this protruding state is shown by the broken line in FIG. 22), by forming the width of the separation tape 401B larger, taking the protruding amount into account, a widthwise direction end portion 401B1 of the separation tape 401B can be surely interposed between the protruding portion 401*e*2 of the adhesive layer 401*e* and the adhesive layer 401*a*, and wrong adhesion can be prevented.

Moreover, since the width of the adhesive layer 401*e* is smaller than that of the separation tape 401B, wrong adhesion of the protruding portion 401*e*2 to the side wall of the first roll 102 arrangement portion in the cartridge 100 can be also prevented.

As a result, the feeding-out performance of the tag tape 401 from the first roll 102 can be maintained favorable.

Also, in this embodiment, the color of the adhesive layer 401*c* of the separation tape 401B is made approximately in the same color of the base film 401*b* of the base tape 401A as mentioned above. That is, in this embodiment, since the width of the separation tape 401B is formed wider than that of the base tape 401A, the portion of the adhesive layer 401*c* of the separation tape 401B wider than the base tape 401A is protruded and exposed from the end portion of the base tape 401A in the widthwise direction, but by making the color of the adhesive layer 401*c* approximately in the same as that of the base film 401*b* as mentioned above, the color of the base tape 401A (that is, the color of the base film 401*b*) and the color of the adhesive layer 401*c* protruding from the width of the base tape 401A can be made approximately the same when seen from a user. By this, a sense of discomfort in color in the protruding portion when formed into the RFID label T can be surely eliminated.

Also, with regard to the relatively thick adhesive layer 401*e* in a large quantity for disposal of the RFID circuit element To as mentioned above, by making it approximately in the same color as that of the base tape 401A (that is, the color of the base film 401*b*) in case that the thick adhesive layer in the large quantity somewhat protrudes outward from the end portion of the tape in the widthwise direction when bonded together, the sense of discomfort in color in the protruding portion can be surely eliminated as above.

Moreover, in this embodiment, the width of the cover film 103 is formed further larger than that of the separation tape 401B wider in width than the base tape 401A as mentioned above. By making the width of the cover film 103 the largest in this way, protrusion of the base tape 401A and the separation tape 401B from the end portion of the cover film 103 in the widthwise direction can be prevented when the cover film 103 is bonded to the tag tape 401, and the beautiful RFID label T with print can be created without a visual sense of discomfort when seen from a user.

The second embodiment of the present invention is capable of various variations in a range without departing from its gist and technical idea. The variations will be described below.

(2-1) When Bonding is not Carried Out:

That is, not that the print is carried out on the cover film 103 different from the tag tape 401 provided with the RFID circuit element To and they are bonded together as in the above embodiment, but this is the case that the present invention is applied to the cartridge for including at least a RFID tag for carrying out print on the base film provided at the thermal tape.

FIG. 24 is an explanatory diagram for illustrating a detailed structure of a cartridge 100' of this variation, which corresponds to the above FIG. 19. The equivalent portions to FIG. 19 are given the same reference numerals and the description will be omitted as appropriate.

In FIG. 24, the cartridge 100' includes a first roll (roll of tape with RFID tag) 102I wound with a thermal tape (tag tape) 401, the tape feed roller 107' configured to feed a thermal tape 401-1 in a direction outside the cartridge 100', and the guide roller 120 configured to feed the thermal tape 401-1 while changing the transport direction thereof.

In the first roll 102', the strip-shaped thermal tape 401-1 (colored in a predetermined color so that the RFID circuit element To is not visible from the print side, for example) in which a plurality of the RFID circuit elements To are sequentially formed in the lengthwise direction is wound around a reel member 102'*a*.

The thermal tape 401-1 wound around the first roll 102' is in a four-layered structure in this example (See a partially enlarged view in FIG. 24) and is formed in lamination in the order of a base film (base layer) 401-1*a* made of polyethylene terephthalate (PET) and the like, an adhesive layer (adhesive layer for mounting) 401-1*e* made of an appropriate adhesive provided with approximately the same color as that of the base film 401-1*a*, an adhesive layer (adhesive layer for affixing) 401-1*b* made of an appropriate adhesive provided with approximately the same color as that of the base film 401-1*a*, and a separation sheet (separation layer) 401-1*c* from the side wound outside (right side in FIG. 24) toward the opposite side (left side in FIG. 24). On the front surface of the base film 401-1*a*, a thermal agent producing color by heat is applied.

On the back side of the base film 401-1*a*, the adhesive layer 401-1*e* is formed. By this adhesive layer 401-1*e*, the RFID circuit element To composed of the IC circuit part 151 configured to store information and the antenna (tag antenna) 152 configured to transmit and receive information, connected to the IC circuit part 151, is bonded to the base film 401-1*a*.

Also, on the back side of the adhesive layer 401-1*e* (left side in FIG. 24), the adhesive layer 401-1*b* configured to bond the separation sheet 401-1*c* to the base film 401-1*a* is disposed so as to include the RFID circuit element To. The adhesive layer 401-1*b* and the adhesive layer 401-1*e* are firmly bonded together, and the adhesive layers 401-1*b* and 401-1*e* are brought into approximately the integrally bonded state at the manufacture of the thermal tape 401-1. Then, when the RFID label T finally completed in the label shape is to be affixed to a predetermined commodity or the like as mentioned above, the separation sheet 401-1*c* is peeled off the thermal tape side body (adhesive layer 401-1*b*) so that the RFID label T is affixed to the commodity or the like by the adhesive layer 401-1*b*.

When the cartridge 100' is mounted to the cartridge holder portion of the apparatus 2 for communicating with a RFID tag and the roller holder (not shown) is moved from a separated position to a contact position, the thermal tape 401-1 is held between the print head 10 and the platen roller 108 and between the tape feed roller 107' and the sub roller 109. The tape feed roller 107', the sub roller 109, and the platen roller 108 are rotated in synchronization with each other accompanied by driving of the tape-feed-roller drive shaft 12 with a driving force of the motor to drive cartridge shaft 23 (See FIG. 18), and the thermal tape 401-1 is fed out from the first roll 102B, redirected by the guide roller 120 and supplied to the side of the print head 10.

A plurality of heating elements of the print head 10 is supplied with a power through the print-head drive circuit 25 (See FIG. 18), and thereby the print is printed on the surface of the base film 401-1*a* of the thermal tape 401-1. The tape is formed as a tag label tape 110 with print' and then, fed out from the cartridge 100'. Note that it is needless to say that print may be carried out using the ink ribbon as in the above embodiment.

Since the access (information reading/writing) to the RFID tag information through the antenna 14, feeding by the feeding roller 17, cutting by the cutter 15 and the like after feeding-out of the cartridge 100' are the same as those in the above embodiment, the description will be omitted.

FIG. 25 is a conceptual side view illustrating a detailed structure of the first roll 102', and FIG. 26 is a lateral sectional view taken along the line Q-Q' in FIG. 25 illustrating the laminated structure of the two thermal tapes 401-1 adjacent to each other in the radial direction of the first roll 102'. As shown in FIG. 26, the width of the separation tape 401-1B composed of the adhesive layer 401-1*b* and the separation sheet 401-1*c* of the thermal tape 401-1 is formed larger than those of the base tape 401A made of the base film 401-1*a* and the adhesive layer 401-1*e* of the thermal tape 401-1.

In this variation arranged as above, approximately the same effect as that of the above embodiment can be also obtained. This will be described below in detail using a comparative example.

As shown in FIGS. 25 and 26, when the first roll (roll of tape with RFID tag) 102' is formed by winding the thermal tape 401-1 having the laminated structure composed of the base tape 401-1A and the separation material sheet 401-1B, the laminated structure is overlapped and wound in the radial direction of the roll, and the separation tape 401-1B and the base film 401-1*a* are interposed between the adhesive layer 401-1*e* included in the thermal tape 401-1 layer outside in the radial direction (upper side in FIG. 26) and the adhesive layer 401-1*e* included in the thermal tape 401-1 layer adjacent thereto inside the radial direction (lower side in FIG. 26) as shown in FIG. 26.

Here, since the adhesive layer 401-1*e* is generally formed relatively thick for bonding of the RFID circuit element To as mentioned above, there is a possibility that when the separation tape 401-1B is bonded to the base tape 401-1A, the adhesive of the thick adhesive layer 401-1*e* in a large quantity somewhat protrudes outward from the end portion in the widthwise direction of the tape (this protruding state is shown by a broken line in FIG. 26).

At this time, suppose the case that a thermal tape roll is formed by winding a thermal tape 401-1' having a separation tape 401-1B' with approximately the same width as that of the base tape 401-1A as a comparative example. FIG. 27 is a lateral sectional view illustrating the laminated structure of the two thermal tapes 401-1' adjacent to each other in the radial direction when the thermal tape 401-1' is wound in this comparative example and corresponds to FIG. 26. The same reference numerals are given to the equivalent portions in FIG. 26 and the description will be omitted as appropriate.

As shown in FIG. 27, the thermal tape 401-1' of this comparative example is provided with the laminated structure composed of the base film 401-1*a*, the adhesive layer 401-1*e*, the adhesive layer 401-1*b'*, and the separation sheet 401-1*c'*, each of which being formed with approximately the same width.

In this comparative example arranged as above, supposedly, since there is nothing to be interposed between the protruding portion 401-1*e*1 of the adhesive layer 401-1*e* included in the thermal tape 401-1' outside in the radial direction (upper side in FIG. 27) and the protruding portion 401-1*e*1 of the adhesive layer 401-1*e* included in the thermal tape 401-1' adjacent thereto inside the radial direction (lower side in FIG. 27) at the manufacture of the thermal tape roll, there is a possibility that the protruding portions 401-1*e*1 and 401-1*e*1 stick to each other as shown by an arrow D in FIG. 27 (=causes wrong adhesion between the adhesives).

Particularly, if the center positions are displaced between the base tape 401-1A and the separation tape 401-1B' (center position displacement due to the reason of accuracy as mentioned above. This displaced state is shown by a dashed line in FIG. 27) at the manufacture of the thermal tape 401-1' as mentioned above, apart 401-1*e*2 of the adhesive layer 401-1*e* which should have been covered by the separation sheet 401-1B' is exposed. As a result, there is a further possibility that the wrong adhesion occurs between the protruding portions 401-1*e*1 and 401-1*e*1.

In contrast, in this embodiment, since the width of the separation tape 401-1B is formed larger than that of the base tape 401-1A as shown in FIG. 26, the end portion in the widthwise direction of the separation tape 401-1B can be surely interposed between the protruding portions 401-1*e*1 of the adhesives of the thermal tape 401-1 layers adjacent to each other in the radial direction to enable prevention of the wrong adhesion.

Also, even if the above center position displacement in the widthwise direction occurs between the base tape 401-1A and the separation tape 401-1B at the manufacture (this displaced state is shown by the dashed line in FIG. 26), the widthwise direction end portion 401-1B1 of the separation sheet 401-1B can be surely interposed between the protruding portions 401-1*e*1 to enable prevention of the wrong adhesion.

Moreover, since the width of the adhesive layer 401-1*e* is made smaller than that of the separation tape 401-1B, the wrong adhesion of the protruding portion 401-1*e*1 to the side wall of the first roll 102' arrangement portion in the cartridge 100' can be also prevented.

As a result, the feeding-out performance of the thermal tape 401-1 from the first roll 102' can be maintained favorable.

Also, since the color of the adhesive layer 401-1*b* of the separation tape 401-1B is made approximately in the same color as that of the base film 401-1*a* of the base tape 401-1A as mentioned above, a sense of discomfort in color in the protruding portion when formed into the RFID label T can be surely eliminated.

Also, with regard to the relatively thick adhesive layer 401-1*e* in a large quantity for disposal of the RFID circuit element To as mentioned above, by making it in the same color as that of the base tape 401-1*a* in case that the thick adhesive layer in the large quantity somewhat protrudes outward from the end portion of the tape in the widthwise direction when bonded together, the sense of discomfort in color in the protruding portion can be surely eliminated as above.

In the above variation, print is carried out by bringing the print head 10 into contact with the base film 401Ba from outside the cartridge 100', but not limited thereto, the print may be carried out from inside the cartridge 100' as with the above embodiment.

(2-2) When an Intermediate Layer Tape is Provided:

FIG. 28 is a lateral sectional view illustrating a laminated structure of two tag tapes 401" adjacent to each other in the radial direction of a roll of tape with RFID tag in this variation.

As shown in FIG. 28, the tag tape 401" of this variation is provided with an intermediate layer tape (intermediate tape layer) 401C formed of an adhesive layer 401*f* and a base film

401g between the base tape 401A composed of the adhesive layer 401a, the base film 401b, and the adhesive layer 401e and the separation tape 401B composed of the adhesive layer 401c and the separation sheet 401d. The intermediate layer tape 401C is used when the base film 401b of the base tape 401A is constructed as transparent and the base film 401g of the intermediate layer tape 401C as colored so that the tape color of the RFID label T is changed in various ways by the intermediate layer tape 401C.

The intermediate layer tape 401C is formed with approximately the same width as that of the base tape 401A, and its adhesive layer 401f is bonded to the adhesive layer 401e of the base tape 401A so as to include the RFID circuit element To. Also, on the back side of the base film g of the intermediate layer tape 401C (lower side in FIG. 28), the adhesive layer 401c of the separation tape 401B is bonded.

When the roll of tape with RFID tag is formed by winding the tag tape 401" arranged as above, the laminated structure is overlapped and wound in the radial direction of the roll, and the intermediate layer tape 401C, the separation tape 401B, and the adhesive layer 401a as well as the base film 401b are interposed between the adhesive layer 401e included in the tag tape 401" layer outside in the radial direction (upper side in FIG. 28) and the adhesive layer 401e included in the tag tape 401" layer adjacent thereto inside in the radial direction (lower side in FIG. 28) as shown in FIG. 28.

Here, since the adhesive layer 401e is generally formed relatively thick for bonding of the RFID circuit element To as mentioned above, there is a possibility that when the intermediate layer tape 401C is bonded to the base tape 401A, the adhesive of the thick adhesive layer 401e in a large quantity somewhat protrudes outward from the end portion in the widthwise direction of the tape (this protruding state is shown by a broken line in FIG. 28).

Though particular description using the drawings will not be made, when the case is supposed that the tag tape having the separation tape with approximately the same width as those of the base tape 401A and the intermediate layer tape 401C is wound so as to form the roll of tape with RFID tag as a comparative example, since there is nothing to be interposed between the protruding portion 401e2 of the adhesive layer 401e included in the tag tape layer outside in the radial direction and the protruding portion 401e2 of the adhesive layer 401e included in the tag tape adjacent thereto inside the radial direction, there is a possibility that the protruding portions 401e2 and 401e2 stick to each other (=causes wrong adhesion between the adhesives). Particularly, if the above center position displacement occurs between the base tape 401A and the intermediate layer tape 401C (the center position displacement due to the above-mentioned accuracy reason) at the manufacture of the tag tape, there is a further possibility that the protruding portions 401e2, 401e2 make the wrong adhesion.

In contrast, in this variation, since the width of the separation tape 401B is formed larger than those of the base tape 401A and the intermediate layer tape 401C as shown in FIG. 28, the end portion in the widthwise direction of the separation tape 401B can be surely interposed between the protruding portions 401e2 of the adhesives of the tag tapes 401" layers adjacent to each other in the radial direction to enable prevention of the wrong adhesion.

Also, even if the above center position displacement in the widthwise direction occurs between the base tape 401A as well as the intermediate layer tape 401C and the separation tape 401B at the manufacture (this displaced state is shown by the dashed line in FIG. 28), the widthwise direction end portion 401B1 of the separation sheet 401B can be surely interposed between the protruding portions 401e2 so as to prevent the wrong adhesion, and moreover, the wrong adhesion of protruding portion 401e2 to the side wall of the first roll 102 disposal portion in the cartridge 100 can be also prevented.

As a result, the feeding-out performance of the tag tape 401" from the first roll 102 can be also maintained favorable in this variation.

Note that it is needless to say that the structures of the second embodiment and the variations of (2-1) and (2-2) may be partially combined as appropriate, and the similar effects can be also obtained in these cases.

Moreover, in the first and the second embodiments and their variations, the present invention is not limited to those detachably mounted to the RFID tag information communication apparatus body side such as the cartridge 100, 100' and the like, but a so-called fixing or integral type which is not detachable with respect to the apparatus body side may be used, in which the first roll 102 and the like are provided therein. The similar effects can be also obtained in this case.

Furthermore, in the above, in the apparatus 2 for communicating with a RFID tag, the RFID tag information is read or written from or into the IC circuit part 151 of the RFID circuit element To and printing (print) is carried out by a thermal head 10 for identifying the RFID circuit element To. But the printing does not necessarily have to be carried out but the present invention may be applied to those only for reading or writing of the RFID tag information.

A third embodiment of the present invention will be described below referring to the attached drawings. The same reference numerals are used for the equivalent portions to the first embodiment, and the description will be omitted or simplified as appropriate.

FIG. 29 is a conceptual block diagram illustrating a detailed structure of a apparatus 2 for communicating with a RFID tag provided with a roll of tape with RFID tag of this embodiment, FIG. 30 is an explanatory diagram for illustrating a detailed structure of the cartridge 100 provided with the roll of tape with RFID tag according to this embodiment provided at the apparatus 2 for communicating with a RFID tag, and they correspond to FIGS. 2 and 3 in the first embodiment and FIGS. 18 and 19 in the second embodiment, respectively.

In FIGS. 29 and 30, a cartridge (cartridge for including at least a RFID tag) 100 is detachably mounted to a cartridge holder portion (not shown) of the apparatus 2 for communicating with a RFID tag. A main body 8 has, as with the first and the second embodiments, a housing 9, a print head (thermal head) 10, a tape-feed-roller drive shaft 12, an antenna 14, a cutter 15, a feeding guide 13, a feeding roller 17, a tape end sensor 18, a radio frequency circuit 21, a signal processing circuit 22, a motor to drive cartridge shaft 23, a cartridge shaft drive circuit 24, a print-head drive circuit 25, a solenoid 26, a solenoid drive circuit 27, a tape-feeding roller motor 28, a tape-feeding roller drive circuit 29, and a control circuit 30.

The cartridge 100 has a thermal tape roll (roll of tape with RFID tag) 102 wound with a thermal tape 501 as a tag tape, a tape feed roller 107 configured to feed the thermal tape 501 in a direction outside the cartridge 100, and a guide roller 120 configured to feed the thermal tape 501 while changing the transport direction thereof.

In the thermal tape roll 102, the strip-shaped (colored in a predetermined color so that the RFID circuit element To is not visible from the print side, for example) thermal tape 501 on which a plurality of the RFID circuit element To are formed sequentially in the lengthwise direction is wound around a reel member 102a (in other words, around a axis approximately perpendicular to the tape lengthwise direction).

The thermal tape 501 wound around the thermal tape roll 102 is in a four-layered structure in this example (See a partially enlarged view in FIG. 30) and is formed in lamination in the order of a base film (base layer) 501a made of polyethylene terephthalate (PET) and the like, a first adhesive layer (adhesive layer for mounting) 501b made of an appropriate adhesive, a second adhesive layer (adhesive layer for affixing) 501c made of an appropriate adhesive, and a separation sheet (separation layer) 501d from the side wound outside (right side in FIG. 30) toward the opposite side (left side in FIG. 30).

On the front side surface of the base film 501a, a thermal agent producing color by heat is applied. On the back side of the base film 501a, the IC circuit part 151 configured to store information and the antenna 152 is provided through the first adhesive layer 501b.

The separation sheet 501d is made so that the RFID label T finally completed in the label shape can be bonded by a second adhesive layer 501c to a predetermined commodity or the like by separating the separation sheet when the RFID tag T is affixed to the commodity.

The tape feed roller 107 is rotated and driven by transmission of a driving force of a motor to drive cartridge shaft 23, which is a pulse motor, for example, provided outside the cartridge 100 (see FIG. 29) to the tape-feed-roller drive shaft 12.

When the cartridge 100 is mounted to the cartridge holder part of the apparatus 2 for communicating with a RFID tag and the roll holder (not shown) is moved from a separated position to a contact position, the thermal tape 501 is held between the print head 10 and the platen roller 108 and between the tape feed roller 107 and the sub roller 109. The tape feed roller 107, the sub roller 109, and the platen roller 108 are rotated in synchronization with each other accompanied by driving of the tape-feed-roller drive shaft 12 with a driving force of the motor to drive cartridge shaft 23 (See FIG. 29), and the thermal tape 501 is fed out from the thermal tape roll 102, redirected by the guide roller 120 and supplied to the side of the print head 10.

A plurality of heating elements of the print head 10 is supplied with a power through the print-head drive circuit 25 (See FIG. 29), and thereby the print is printed on the surface of the base film 501a of the thermal tape 501. The tape is formed as a tag label tape 110 with print, and then fed out from the cartridge 100. Incidentally, print may be carried out using the ink ribbon.

The structure not particularly described in the above is approximately the same as that of the first and the second embodiments. The most distinctive characteristic of this embodiment is in the relation of the widths of the base film 501a, the first adhesive layer 501b, the second adhesive layer 501c, and the separation sheet 501d composing the thermal tape 501. The detail will be described below.

FIG. 31 is a lateral sectional view illustrating an example of an appearance of the RFID label T formed after information reading (or writing) of the RFID circuit element To and cutting of the tag label tape 110 with print have been finished as mentioned above.

In FIG. 31, the RFID label T is in a four-layered structure as mentioned using FIG. 30, in which the base film 501a with the dimension of a in the widthwise direction (right and left direction in FIG. 31, the same applies to the following) crossing the tape lengthwise direction (perpendicular direction toward the paper in FIG. 31), a first adhesive layer 501b with the width of b, a second adhesive layer 501c with the width of d, and a separation sheet 501d with the width of e from the upper side in FIG. 31 to the opposite side. At this time, the relations of a≧b and a≧d as well as e≧b and e≧d are established in the widths a, b, d, and e (the example shown in FIG. 31 represents a state of inequality, which is not equality). In other words, the base film 501a has its width a formed larger than or at least equal to any of the first adhesive layer 501b and the second adhesive layer 501c all the times. Similarly, the separation sheet 501d has its width e formed larger than or at least equal to any of the first adhesive layer 501b and the second adhesive layer 501c all the times. Moreover, this example is particularly formed as e>a, that is, so that the width e of the separation sheet 501d is larger than that of the base film 501a (in other words, to become the largest width in all the layers including the first adhesive layer 501b and the second adhesive layer 501c).

As mentioned above, the RFID circuit element To is disposed so as to be held between the first adhesive layer 501b and the second adhesive layer 501c, and the print R is printed on the surface of the base film 501a.

Another characteristic of this embodiment is ease-to-separate process of the separation sheet 501d. As mentioned above, since the separation sheet 501d is to be separated when the RFID label T is affixed to a predetermined commodity or the like, known ease-to-separate process x1 made of silicon, fluorine coating or the like, for example, is applied to the surface of the second side of the adhesive layer 501c (upper side in FIG. 31) for easy separation. In the thermal tape 501 of this embodiment, the similar (however, it may be processing with physical properties different from that of the ease-to-separate process x1) ease-to-separate process x2 is applied to the side opposite (lower side in FIG. 31) to the second side of the adhesive layer 501c of the separation sheet 501d.

In this embodiment arranged as above, to the RFID circuit element To taken out of the cartridge 100 of the apparatus 2 for communicating with a RFID tag as the tag label tape 110 with print and set and held by the feeding guide 13 at a predetermined position (access area) opposed to the antenna 14, an access (reading/writing of the RFID tag information from/into the IC circuit part 151) is made sequentially and cutting is performed by the cutter 15 to the RFID circuit element To so as to create the RFID label T. After the separation sheet 501d is peeled off by a user and the second adhesive layer 501c is exposed, the created RFID label T is affixed to various target commodities through the second adhesive layer 501c for use.

As mentioned above, in this embodiment, the width b of the first adhesive layer 501b and the width d of the second adhesive layer 501c in the thermal tape 501 are made equal to or smaller than the width a of the base film 501a and the width e of the separation sheet 501d. By limiting the dimensions of the adhesive layers 501b, 501c in this way, at least protrusion of the adhesive from the base film 501a and the separation sheet 501d outward in the tape widthwise direction can be prevented. By this, adhesion of the adhesive to a hand when a user handles the thermal tape 501 or the RFID label T manufactured from it, adhesion to the other objects at affixing or adhesion of dusts and stains to the protruding adhesive can be also eliminated. Particularly, in this embodiment, since the width b of the first adhesive layer 501a and the width d of the second adhesive layer 501c are made smaller than the width a of the base film 501a and the width e of the separation sheet 501d, outward protrusion of the adhesive from the base film 501a and the separation sheet 501d can be surely prevented. Also, in this embodiment, since the width e of the separation sheet is made larger than all the other constituent elements, there is an effect that a user can easily separate the separation sheet 501*d* by hand when affixing the RFID label T.

On the other hand, from the view of eliminating a waste of the RFID circuit element To and preventing cost increase at the manufacture of the thermal tape roll 102, on one side of the tape (base tape) created with a predetermined width in advance by disposing the first adhesive layer 501*b* on the base film 501*a*, the tape (separation tape) made of the second adhesive layer 501*c* and the separation sheet 501*d* is affixed through the RFID circuit element To held between them, and they are wound as a pair severalfold in the radial direction (the second adhesive layer 501*c* and the first adhesive layer 501*b* are firmly bonded, and after the separation tape is affixed to the first side of the adhesive layer 501*b* once at the manufacture of the tag tape, the second adhesive layer 501*c* and the first adhesive layer 501*b* are approximately integrally bonded together so that only the separation sheet 501*d* can be separated). When the base tape and the separation tape are to be bonded together in this way, it is being examined that the base tape wound in the base tape roll and the separation tape wound in the separation tape roll are actually bonded while feeding them out of the respective rolls. At this time, in the base tape roll, lamination is made in the order of the base film 501*a*, the first adhesive layer 501*b*, the base film 501*a*, the first adhesive layer 501*b* and the like, while similarly in the separation tape roll, the lamination is made in the order of the second adhesive layer 501*c*, the separation sheet 501*d*, the second adhesive layer 501*c*, the separation sheet 501*d* and the like. As a result, if used as is, the first adhesive layer 501*b* would stick to the surface of the base film 501*a* in the base tape roll, while the second adhesive layer 501*c* would stick to the surface of the separation sheet 501*d* in the separation tape. Thus, it is necessary to separately interpose therebetween a tape for preventing the sticking of them, thereby causing complication of the work at the manufacture.

Therefore, in this embodiment, not only the ease-to-separate process x1 usually applied to the side of the adhesive layer for affixing of the separation sheet 501*d* but also the predetermined ease-to-separate process x2 is applied to the side (surface side) opposite to the adhesive layer 501*c* for affixing. FIG. 32 is a conceptual side view illustrating a detailed structure of a separation tape roll 501A-R wound with the above separation tape 501A (=the second adhesive layer 501*c*+the separation sheet 501*d*), and FIG. 33 is a lateral sectional view taken along the line R-R' in FIG. 32 illustrating the laminated structure of the two separation tapes 501A adjacent to each other in the radial direction of the separation tape roll 501A.

As shown in FIGS. 32 and 33, when the separation tape roll 501A is formed by winding the separation tape 501A provided with the laminated structure composed of the second adhesive layer 501*c* and the separation sheet 501*d*, the laminated structure is overlapped and wound in the radial direction of the roll, and the second adhesive layer 501*c* included in the separation tape layer inside (lower side in FIG. 33) in the radial direction and the separation sheet 501*d* included in the separation tape layer adjacent thereto outside (upper side in FIG. 33) in the radial direction are brought into contact as shown in FIG. 33. In this embodiment, since the predetermined ease-to-separate process x2 is also applied to the side of the separation sheet 501*d* (surface side) opposite to the adhesive layer 501*c* for affixing, sticking of the second adhesive layer 501*c* to the surface of the separation sheet 501*d* at the contact can be prevented without intervention of a tape for preventing the sticking. As a result, complication of the work at the manufacture can be prevented.

Note that in this example, the sticking of the second adhesive layer 501*c* to the surface of the separation sheet 501*d* at lamination of the separation tape 501A is prevented by applying the ease-to-separate process x2 also to the side of the separation sheet 501*d* (surface side) opposite to the adhesive layer 501*c* for affixing, but instead of this (or in addition to this), the similar ease-to-separate process may be applied to the side of the base film 501*a* (surface side) opposite to the adhesive layer 501*b* for mounting (not shown). In this case, as with the above, sticking of the first adhesive layer 501*b* to the surface of the base film 501*a* at lamination in the order of the base film 501*a*, the first adhesive layer 501*b*, the base film 501*a*, the first adhesive layer 501*b* and the like can be prevented, and complication of the work at the manufacture can be eliminated.

Incidentally, the third embodiment of the present invention is capable of various variations in a range without departing from its gist and technical idea. The variations will be described below.

(3-1) Variation of Dimensional Relation:

The above embodiment is arranged to have the relation of $a \geq b$, $e \geq b$, $c \geq a$, $e \geq a$ for the base film 501*a* (width a), the first adhesive layer 501*b* (width b), the second adhesive layer 501*c* (width d), the separation sheet 501*d* (width e), but not limited thereto. In order to obtain the basic effect of the present invention of prevention of protrusion of the adhesive from the base film 501*a* and the separation sheet 501*d*, other variations are possible in a range satisfying $a \geq b$, $e \geq b$, $a \geq c$, $e \geq c$.

FIG. 34 is a diagram illustrating a case of $a > e$ as an example of such a variation, and FIG. 35 is a diagram illustrating a case of $a \approx b$ as another example.

Also, FIG. 36 is a diagram illustrating a case of $a = b = d$ as still another example. In this case, by making the width a of the base film 501*a*, the width b of the first adhesive layer 501*b*, and the width d of the second adhesive layer 501*c* equal, the tag label tape 110 with print and the RFID label T can be produced with aligned end portions in the widthwise direction of the three layers except the separation sheet 501*d* and good appearance. This arrangement can be easily formed by bonding the base film 501*a*, the first adhesive layer 501*b*, the second adhesive layer 501*c*, and the separation sheet 501*d* together and then, by cutting and removing the both end portions in the widthwise direction of the base film 501*a*, the first adhesive layer 501*b*, and the second adhesive layer 501*c*.

(3-2) Dimension Alignment by Elimination of Both Ends in the Widthwise Direction:

After the tag label tape 110 with print satisfying the relation of $a \geq b$, $e \geq b$, $a \geq c$, $e \geq c$ as mentioned above is produced in the above embodiment or the variation (3-1), both end portions in the tape widthwise direction may be cut and removed using appropriate cutter (it may be separately provided at the apparatus 2 for communicating with a RFID tag, or another cutter outside the apparatus may be used) so as to align the width dimension.

FIGS. 37A and 37B show the case where the tag label tape 110 with print (in the structure shown in FIG. 31) is cut as an example by the above embodiment. FIG. 37A is a state before cutting along a cutting line C, and FIG. 37B illustrates a state where after the cutting of the base film 501*a*, the first adhesive layer 501*b*, and the second adhesive layer 501*c* by the cutting line C, the both end portions in the widthwise direction are removed as shown by a broken arrow in FIG. 37A.

By this, as shown in FIG. 37B, a tape and a label with good appearance can be produced, in which the both end portions in the widthwise direction of the four layers of the base film 501*a*, the first adhesive layer 501*b*, the second adhesive layer 501*c*, and the separation sheet 501*d* are cleanly aligned.

FIGS. 38A and 38B show another case, in which FIG. 38A shows a state before cutting along the cutting line C and FIG. 38B shows a state where after only the base film 501a, the first adhesive layer 501b, and the second adhesive layer 501c are cut along the cutting line C, the both end portions in the widthwise direction are removed as shown by a broken arrow in FIG. 38A.

By this, as shown in FIG. 38B, a tape and a label with good appearance can be produced, in which the end portions in the widthwise direction of the three layers of the base film 501a, the first adhesive layer 501b, and the second adhesive layer 501c are cleanly aligned, while the separation sheet 501d is kept wide.

(3-3) Die-Cut Label:

After the tag label tape 110 with print satisfying the relation of a, e≧b, c as mentioned above is produced in the above embodiment or the variation (1), a so-called die-cut type label may be produced by using appropriate cutter (it may be separately provided at the apparatus 2 for communicating with a RFID tag or another cutter outside the apparatus may be used).

FIGS. 39A, 39B and 40 show the case where the tag label tape 110 with print (in the structure shown in FIG. 36) by the above (3-1) variation is cut as an example. FIG. 39A shows a state before cutting along a cutting line DC and FIG. 40 is a top view of this state seen from the upper side in FIG. 39A. As shown in FIGS. 39A and 40, the cutting line DC is formed so as to cut off a predetermined region including the RFID circuit element To as a die-cut label.

FIG. 39B shows a state where the predetermined region (die-cut label portion) inside is peeled off, after only the base film 501a, the first adhesive layer 501b, and the second adhesive layer 501c are cut off along the cutting line DC.

In this variation, a so-called die-cut type label affixed to a target commodity by a user by separating the three-layered structure (four-layered structure if the RFID circuit element To is included) of the base film 501a, the first adhesive layer 501b, and the second adhesive layer 501c of the region inside the cutting line DC for use can be realized.

(3-4) Others:

In the above third embodiment, the print is carried out by bringing the print head 10 into contact with the base film 501a from outside the cartridge 100, but not limited thereto, print may be carried out from inside the cartridge 100.

Also, the present invention is not limited to those detachably mounted to the apparatus 2 for communicating with a RFID tag side such as the cartridge 100, but a so-called fixing or integral type which is not detachable with respect to the apparatus body side may be used, in which the thermal tape roll 102 and the like are provided inside. The similar effects can be also obtained in this case.

Moreover, in the apparatus 2 for communicating with a RFID tag in the above, the RFID tag information is read or written with the IC circuit part 151 of the RFID circuit element To and printing (print) is carried out by the thermal head 10 for identifying the RFID circuit element To. But the printing does not necessarily have to be carried out but the present invention may be applied to those only for reading or writing of the RFID tag information.

Note that it is needless to say that the arrangements of the third embodiment and the variations of (3-1) to (3-4) may be partially combined as appropriate, and the similar effects can be also obtained in these cases.

Though not individually exemplified, the present invention is put into practice with various changes in a range not departing from its gist.

What is clamed is:

1. A cartridge comprising: a roll of tape with RFID tags comprising a tag tape wound around an axis approximately perpendicular to a lengthwise direction of said tag tape, said tag tape comprising: a base tape comprising a base layer in which a plurality of RFID circuit elements are disposed with a predetermined interval in said lengthwise direction; an adhesive layer for affixing configured to affix said RFID circuit elements to a target to be affixed provided on one side of said base layer, said adhesive layer for affixing having an upper limit or a lower limit of width configured to prevent protrusion in the widthwise direction of said tag tape; and a separation tape comprising said adhesive layer for affixing and a separation layer configured to cover said adhesive layer for affixing, said separation layer being configured to separate from said adhesive layer for affixing, wherein a width of said separation tape is greater than a width of said base tape so as to realize setting of said lower limit; and a roll of print-receiving tape winding a print-receiving tape configured to be bonded to said tag tape fed out from said roll of tape with RFID tags, wherein said base tape of said roll of tape with RFID tags further comprises an adhesive layer for bonding configured to bond said base layer to said print-receiving tape.

2. The cartridge according to claim 1, further comprising an ink ribbon configured to contact said print-receiving tape fed out from said roll of print-receiving tape.

3. The cartridge according to claim 2, wherein: said print-receiving tape is transparent; and a printing of mirror-image is performed on the back surface of said print-receiving tape when contacted by said ink ribbon.

4. A cartridge comprising: a roll of tape with RFID tags comprising a tag tape wound around an axis approximately perpendicular to a lengthwise direction of said tag tape, said tag tape comprising: a base tape comprising a base layer in which a plurality of RFID circuit elements are disposed with a predetermined interval in said lengthwise direction; an adhesive layer for affixing configured to affix said RFID circuit elements to a target to be affixed provided on one side of said base layer, said adhesive layer for affixing having an upper limit or a lower limit of width configured to prevent protrusion in the widthwise direction of said tag tape; and a separation tape comprising said adhesive layer for affixing and a separation layer configured to cover said adhesive layer for affixing, said separation layer being configured to separate from said adhesive layer for affixing, wherein a width of said separation tape is greater than a width of said base tape so as to realize setting of said lower limit; and a roll of print-receiving tape winding a print-receiving tape configured to be bonded to said tag tape fed out from said roll of tape with RFID tags, wherein: said base tape of said roll of tape with RFID tags further comprises an adhesive layer for bonding said base layer to said print-receiving tape; and a width of said print-receiving tape is greater than both the width of said base tape and the width of said separation tape.

5. The cartridge according to claim 4, further comprising an ink ribbon configured to contact said print-receiving tape fed out from said roll of print-receiving tape.

6. The cartridge according to claim 5, wherein: said print-receiving tape is transparent; and a printing of mirror-image is performed on the back surface of said print-receiving tape when contacted by said ink ribbon.

7. The cartridge according to claim 5, wherein: said print-receiving tape is transparent; and the images received on said print-receiving tape are received on a back surface of said print-receiving tape as mirror images when contacted by said ink ribbon.

8. A cartridge comprising: a roll of print-receiving tape configured to receive images printed thereon; and a roll of tag tape wound around an axis approximately perpendicular to a lengthwise direction of said tag tape, said tag tape comprising: a base layer in which a plurality of RFID circuit elements are disposed with a predetermined interval in said lengthwise direction, a first adhesive layer provided on one side of said base layer that is configured to affix each of said plurality of RFID circuit elements to a target, said first adhesive layer having a width configured to prevent protrusion of said first adhesive layer in the widthwise direction of said tag tape, a separation layer affixed to said first adhesive layer opposite the base layer that is configured to cover said adhesive layer and to separate from said first adhesive layer, a width of said separation tape being greater than a width of said base tape, and a second adhesive layer configured to bond said base layer to said print-receiving tape as said roll of tag tape is unwound from the axis.

9. The cartridge according to claim 8, wherein a width of said print-receiving tape is greater than both the width of said base tape and the width of said separation tape.

10. The cartridge according to claim 8, further comprising an ink ribbon configured to contact said print-receiving tape as it is unwound from said roll of print-receiving tape.

* * * * *